(12) United States Patent
Kim

(10) Patent No.: US 11,971,652 B2
(45) Date of Patent: Apr. 30, 2024

(54) CAMERA ACTUATOR AND CAMERA MODULE INCLUDING THE SAME

(71) Applicant: LG INNOTEK CO., LTD., Seoul (KR)

(72) Inventor: Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 539 days.

(21) Appl. No.: 17/292,290

(22) PCT Filed: Oct. 29, 2019

(86) PCT No.: PCT/KR2019/014392
§ 371 (c)(1),
(2) Date: May 7, 2021

(87) PCT Pub. No.: WO2020/096257
PCT Pub. Date: May 14, 2020

(65) Prior Publication Data
US 2021/0389645 A1    Dec. 16, 2021

(30) Foreign Application Priority Data

Nov. 9, 2018    (KR) ........................ 10-2018-0136996

(51) Int. Cl.
*G02B 5/06*    (2006.01)
*G03B 5/06*    (2021.01)
(52) U.S. Cl.
CPC ........ *G03B 5/06* (2013.01); *G03B 2205/0023* (2013.01); *G03B 2205/0046* (2013.01)
(58) Field of Classification Search
CPC .............. G03B 5/06; G03B 2205/0023; G03B 2205/0046; G03B 2205/0069; G03B 5/00;
(Continued)

(56) References Cited

U.S. PATENT DOCUMENTS 7,544,004 B2 *  6/2009  Kawai ................... G02B 7/10
                                                        396/529
8,840,326 B2     9/2014  Kang et al.
(Continued)

FOREIGN PATENT DOCUMENTS

CN       103676073 A     3/2014
CN       108541373 A     9/2018
(Continued)

OTHER PUBLICATIONS

International Search Report (PCT/ISA/210) issued in PCT/KR2019/014392, dated Feb. 21, 2020.

*Primary Examiner* — Mustak Choudhury
(74) *Attorney, Agent, or Firm* — Birch, Stewart, Kolasch & Birch, LLP

(57) ABSTRACT

An embodiment relates to a camera actuator and a camera module including same. The camera actuator according to the embodiment can includes a base; a lens assembly arranged on the base; a guide pin coupled to the base and guiding the lens assembly; a body coupled to the base; a cover coupled to the body; a base pin coupling part arranged on the base and coupled to one side of the guide pin; a cover pin coupling part arranged on the cover and coupled to the other side of the guide pin; and a pin guide part which is arranged on the lens assembly and which guides the guide pin. In the embodiment, the base pin coupling part can include a first coupling groove, the cover pin coupling part can include a first groove, and the pin guide part can include a first hole and a second hole having a size different from that of the first hole.

17 Claims, 19 Drawing Sheets

(58) Field of Classification Search
CPC ........ G03B 30/00; G02B 7/102; H04N 23/55;
H04N 23/57; H04N 23/50; H04N 23/69
See application file for complete search history.

(56) References Cited

U.S. PATENT DOCUMENTS

| | | | |
|---|---|---|---|
| 10,841,474 B2 | 11/2020 | Choi | |
| 2005/0174009 A1* | 8/2005 | Kayama | H04N 23/75 348/E5.04 |
| 2006/0093347 A1 | 5/2006 | Ishimoida et al. | |
| 2006/0204234 A1 | 9/2006 | Kawai et al. | |
| 2012/0140345 A1* | 6/2012 | Chiu | H02N 2/026 359/824 |
| 2013/0301146 A1 | 11/2013 | Okano et al. | |
| 2014/0079384 A1 | 3/2014 | Kang et al. | |
| 2014/0168793 A1 | 6/2014 | Fukino | |
| 2019/0028624 A1 | 1/2019 | Choi | |

FOREIGN PATENT DOCUMENTS

| | | |
|---|---|---|
| JP | 10-104493 A | 4/1998 |
| JP | 2006-178269 A | 7/2006 |
| JP | 2006-227170 A | 8/2006 |
| JP | 2007-206304 A | 8/2007 |
| JP | 2007-256319 A | 10/2007 |
| JP | 2011-133801 A | 7/2011 |
| JP | 2011-232438 A | 11/2011 |
| JP | 2013-83694 A | 5/2013 |
| JP | 2013-148699 A | 8/2013 |
| JP | 2014-21411 A | 2/2014 |
| JP | 2017-194583 A | 10/2017 |
| KR | 10-2010-0098125 A | 9/2010 |
| KR | 10-2013-0096000 A | 8/2013 |
| KR | 10-2014-0071177 A | 6/2014 |

\* cited by examiner

[FIG. 1]
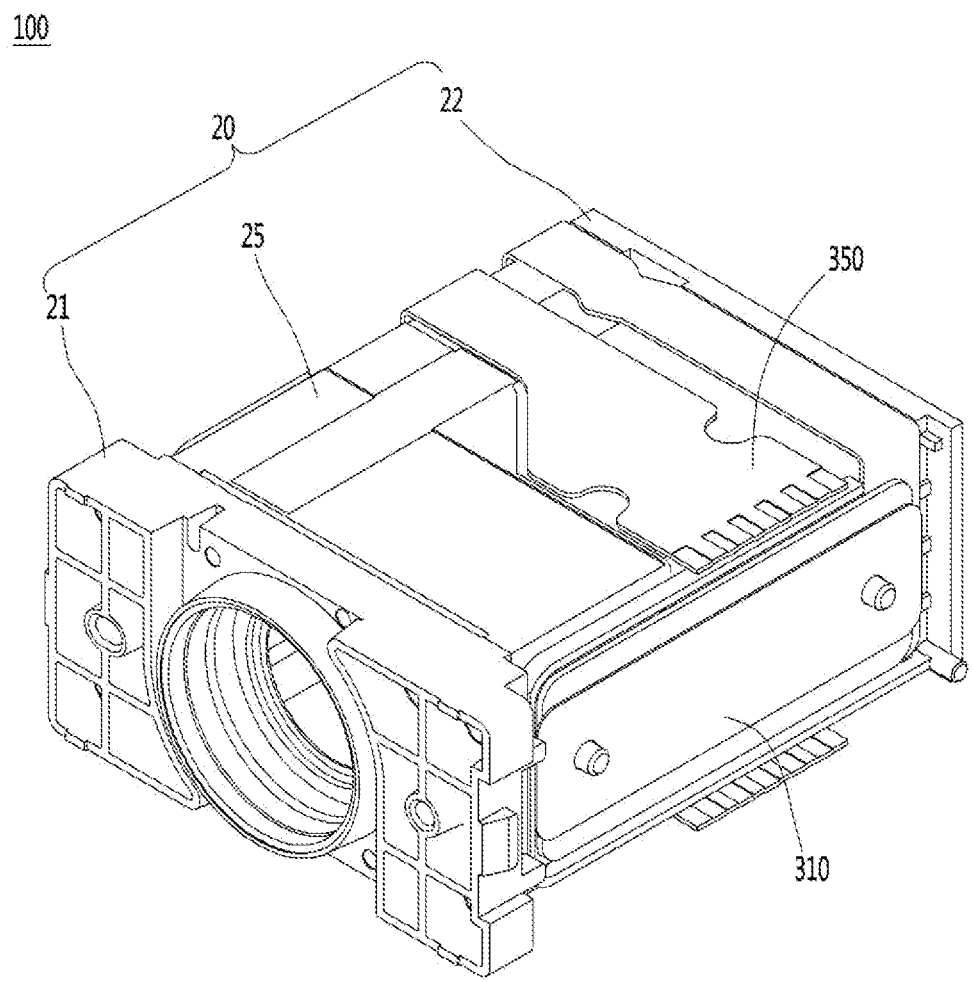

[FIG. 2]
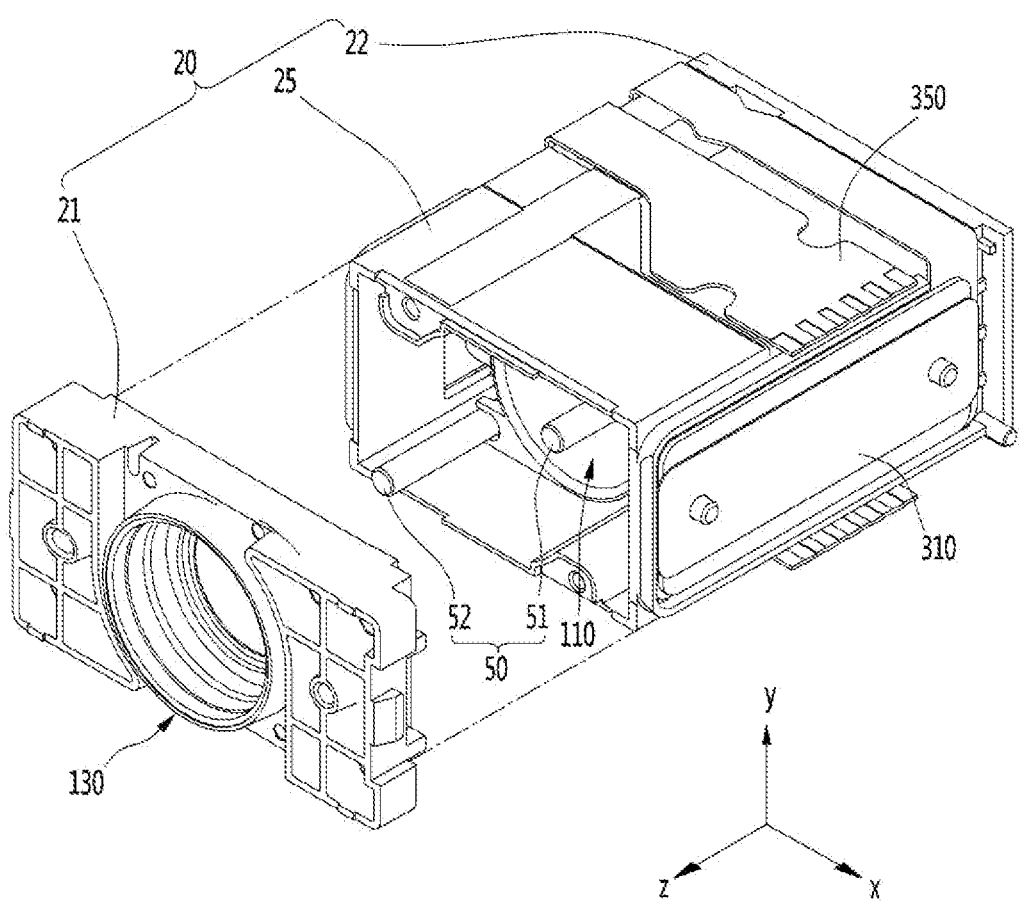

[FIG. 3]
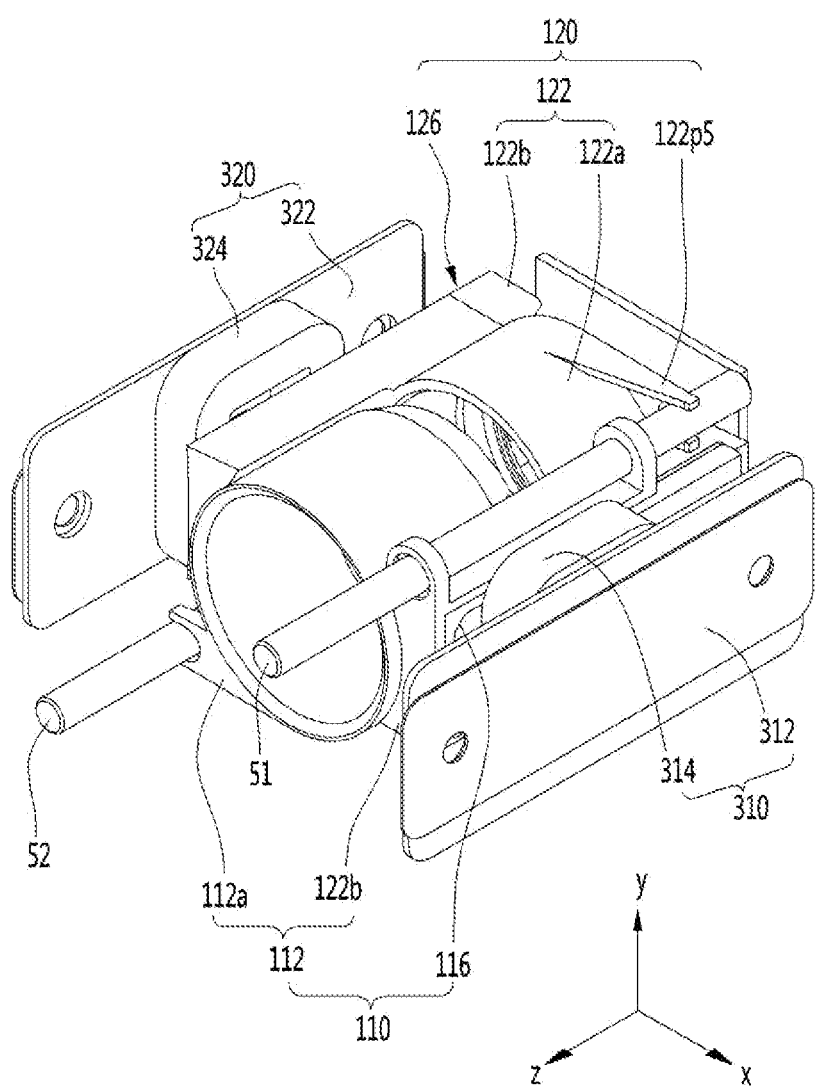

[FIG. 4a]
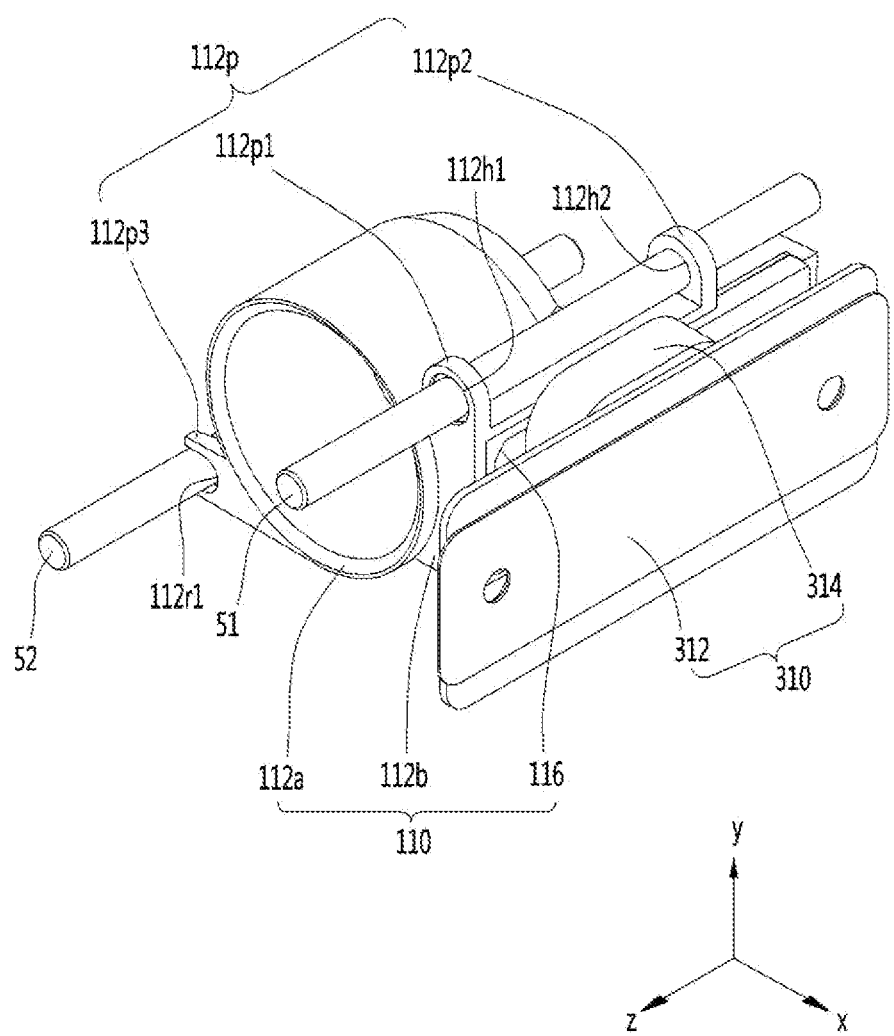

【FIG. 4b】
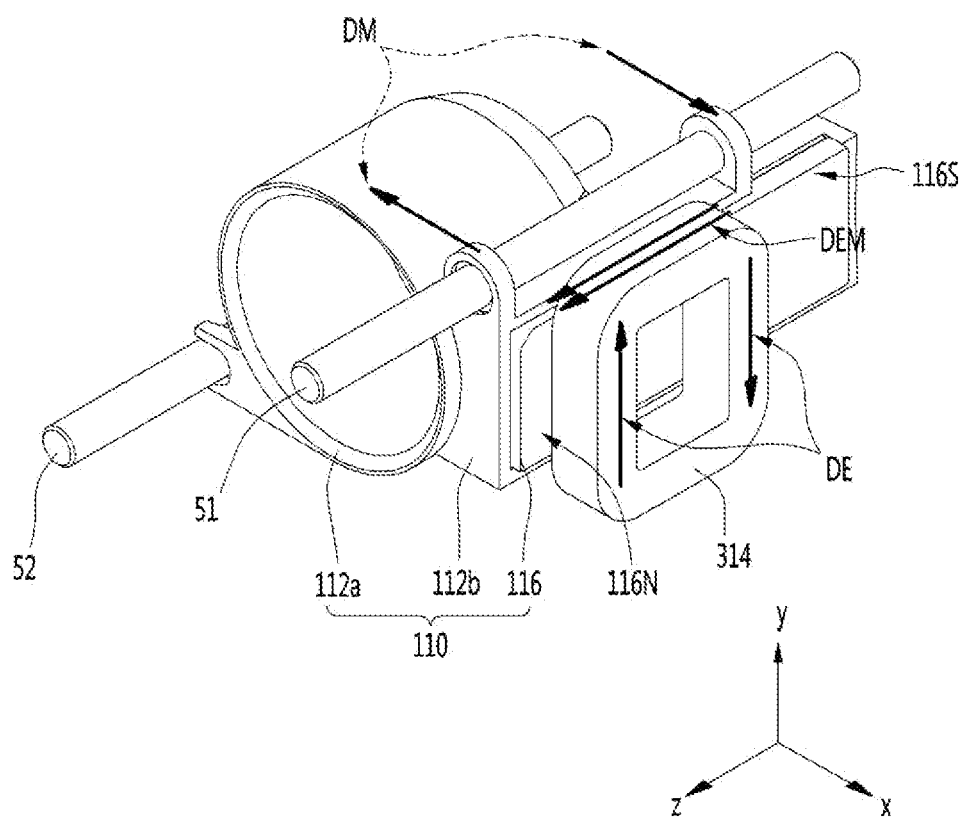

[FIG. 5]
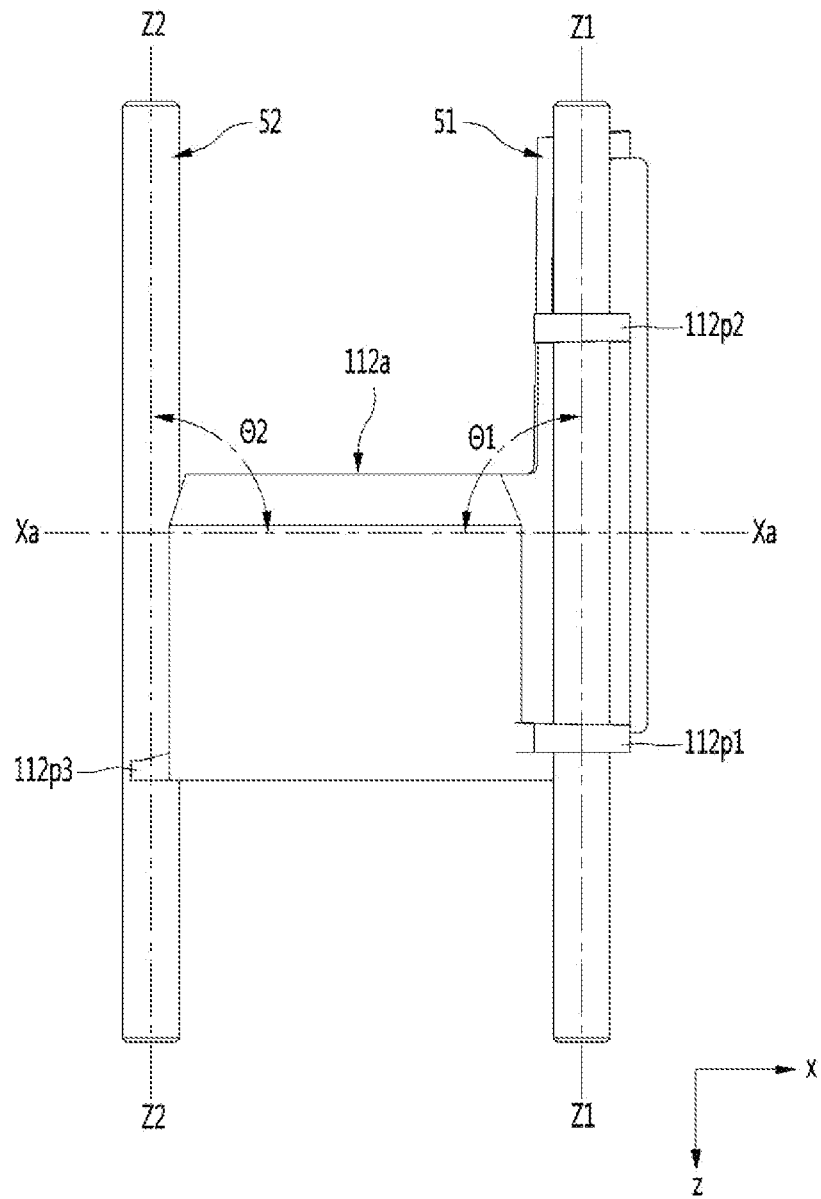

[FIG. 6a]
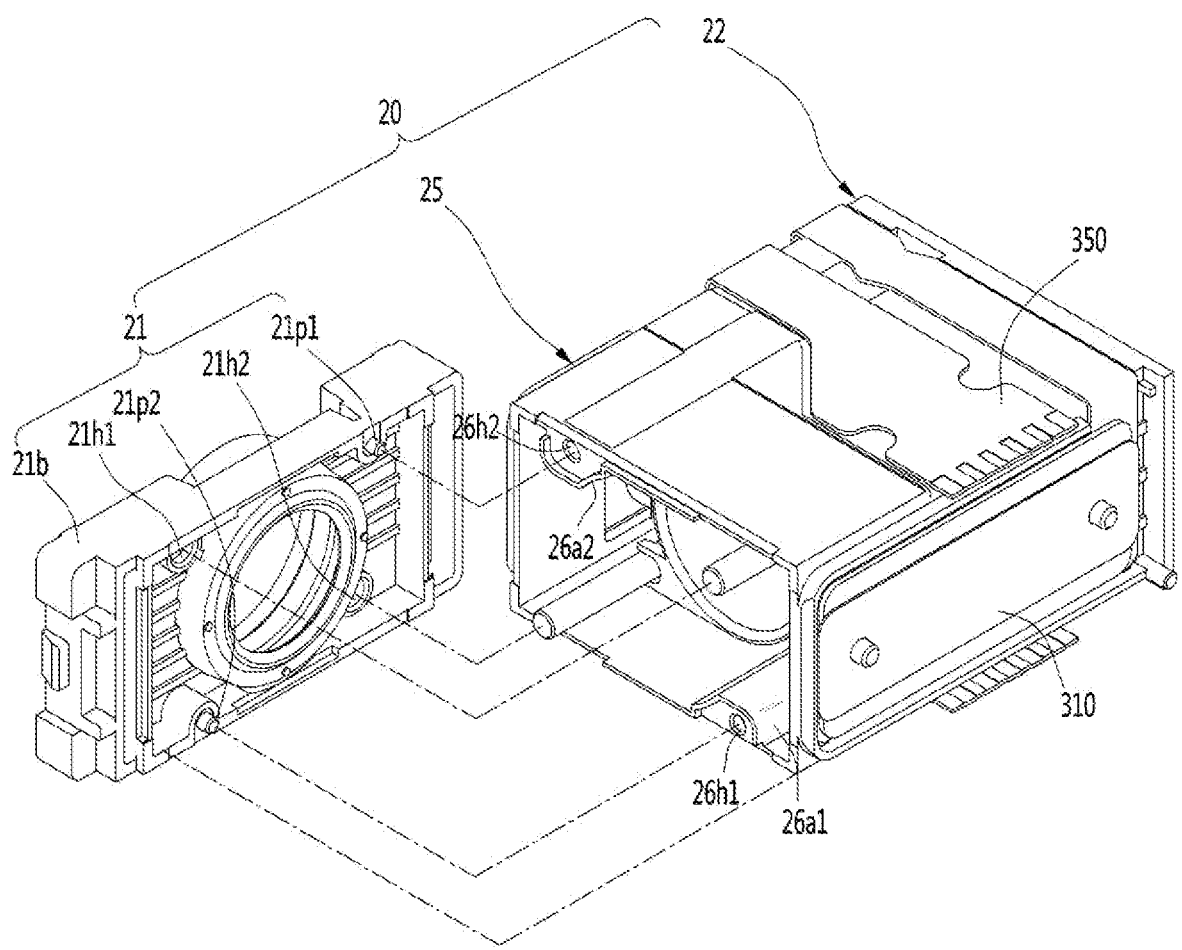

【FIG. 6b】
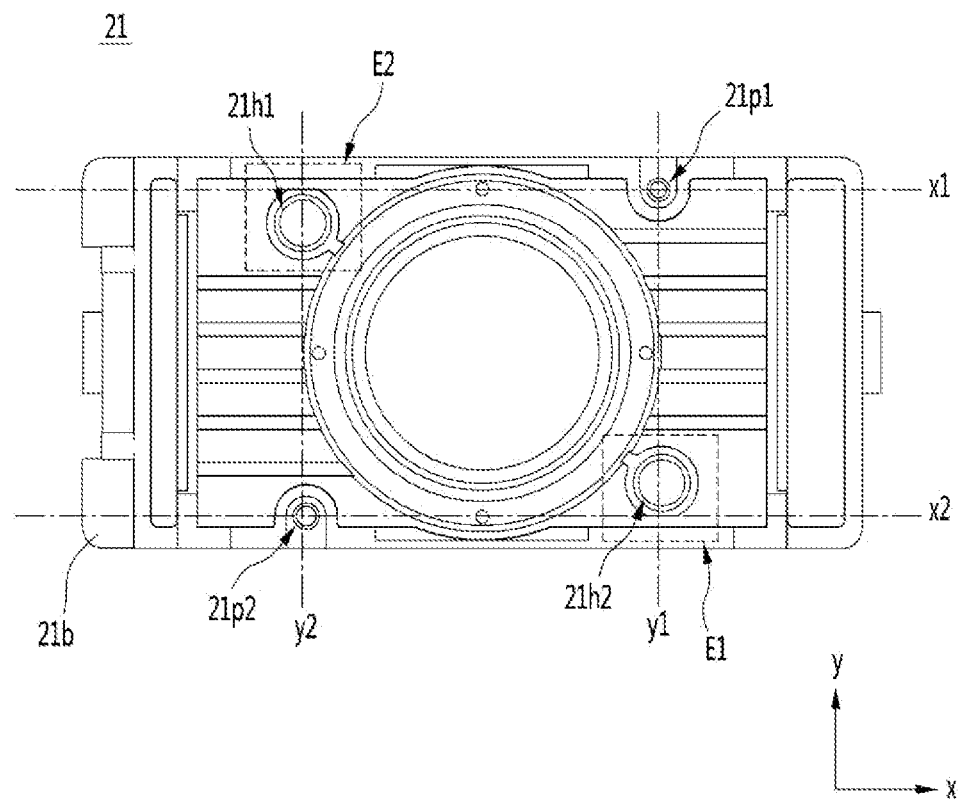
【FIG. 7a】
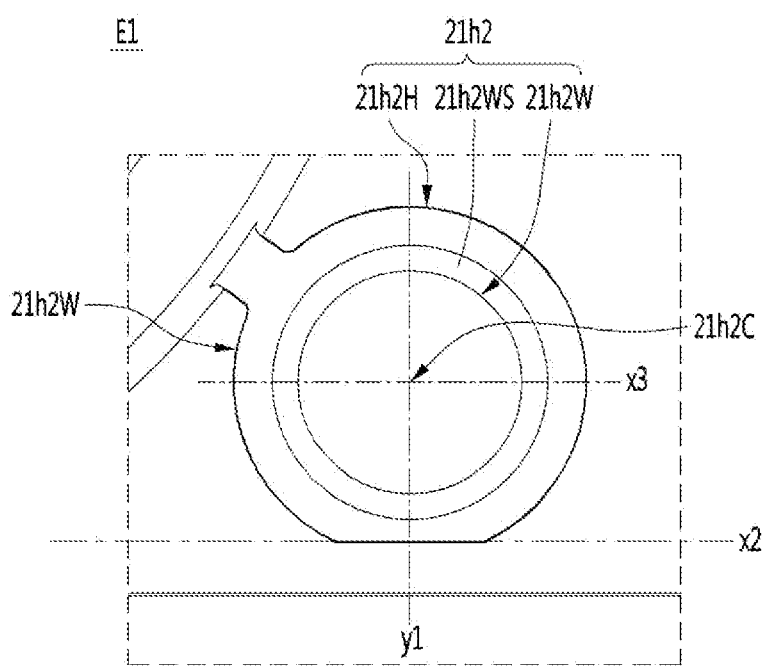

【FIG. 7b】
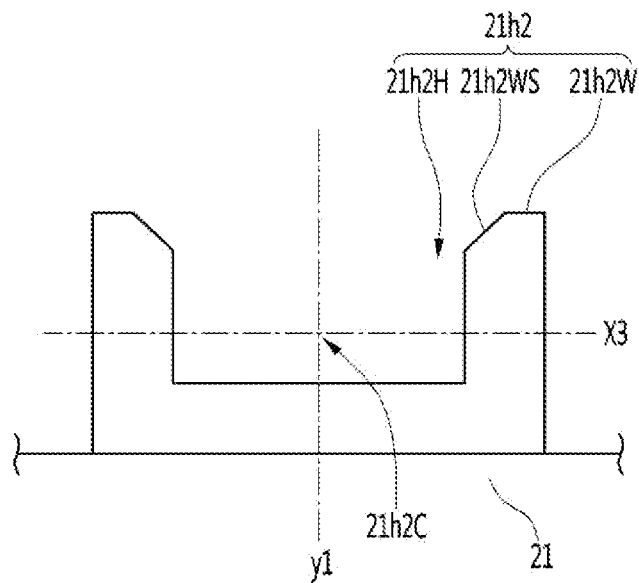
【FIG. 7c】
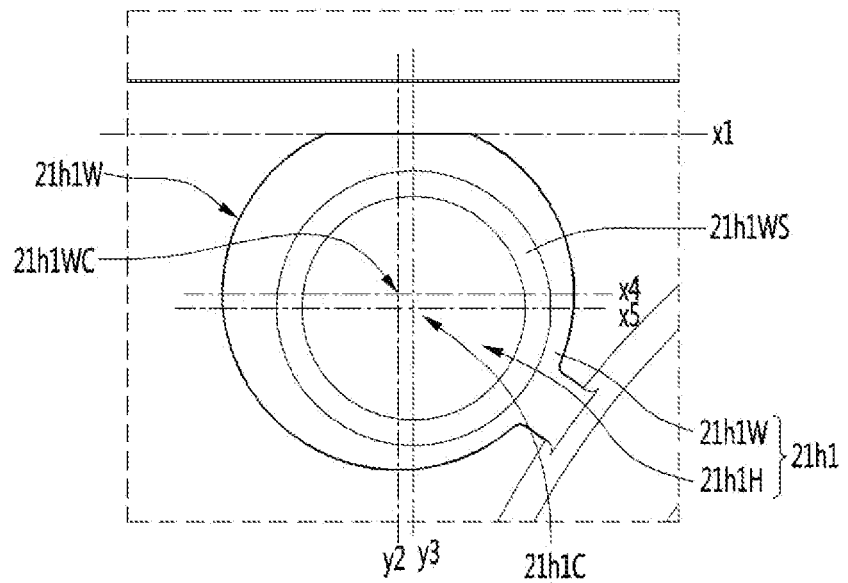

[FIG. 7d]
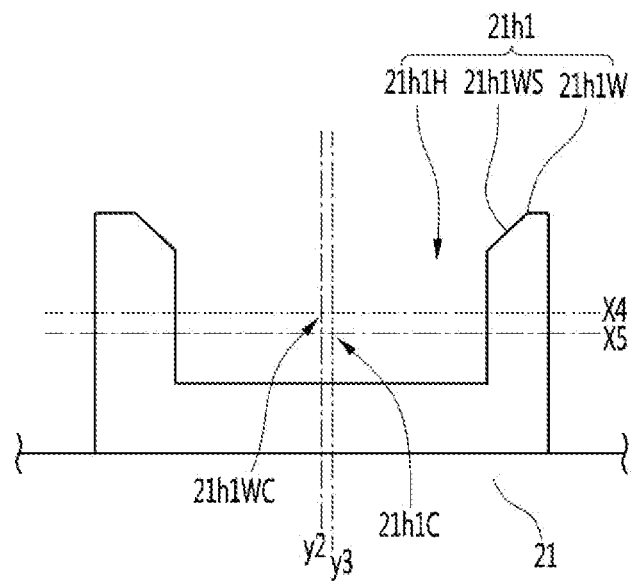
[FIG. 7e]
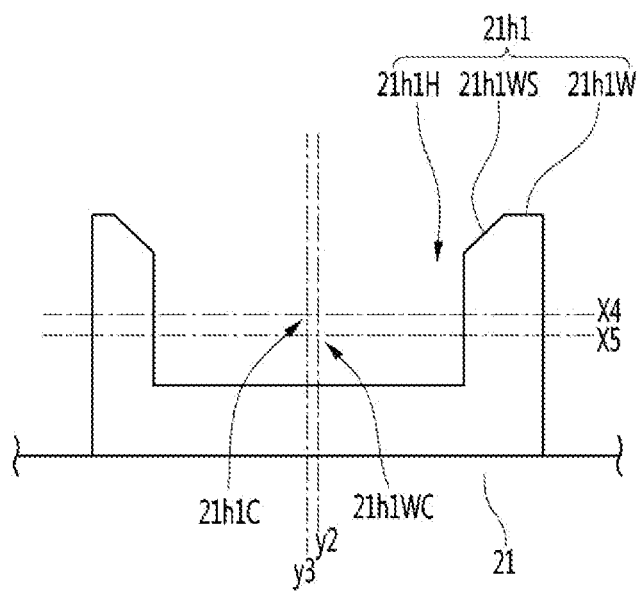

[FIG. 8a]
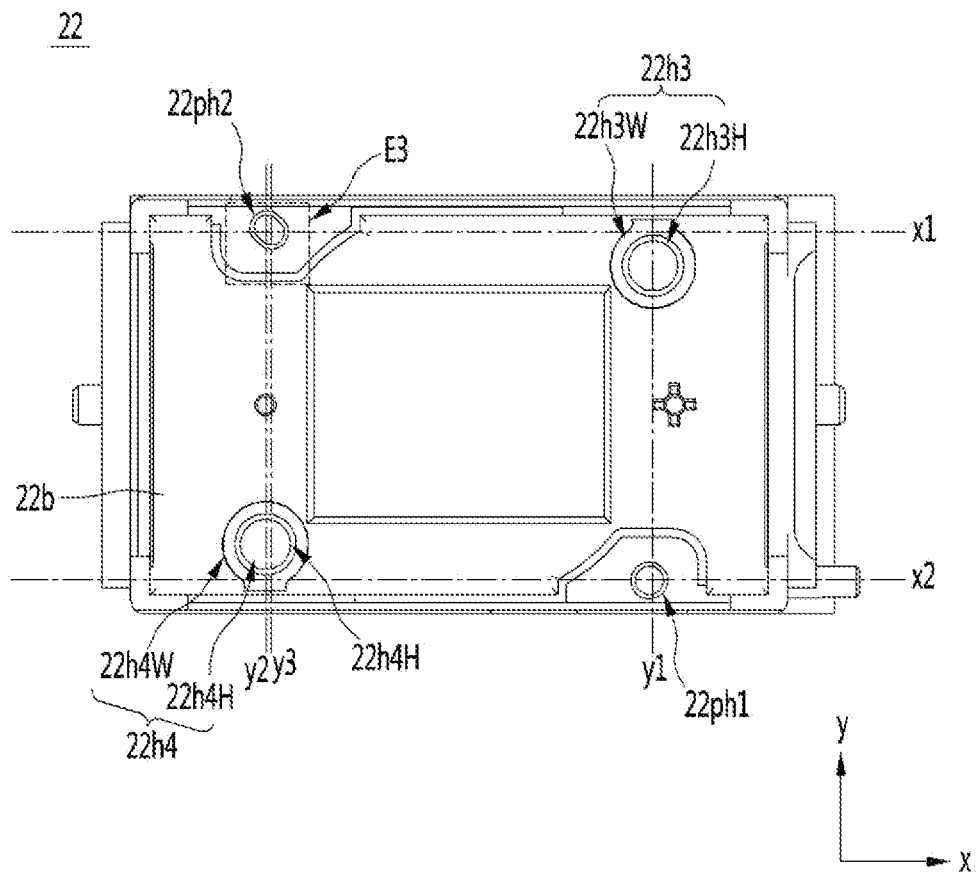
[FIG. 8b]
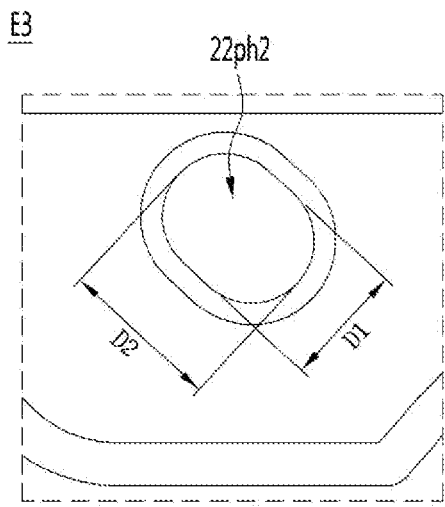

[FIG. 9a]
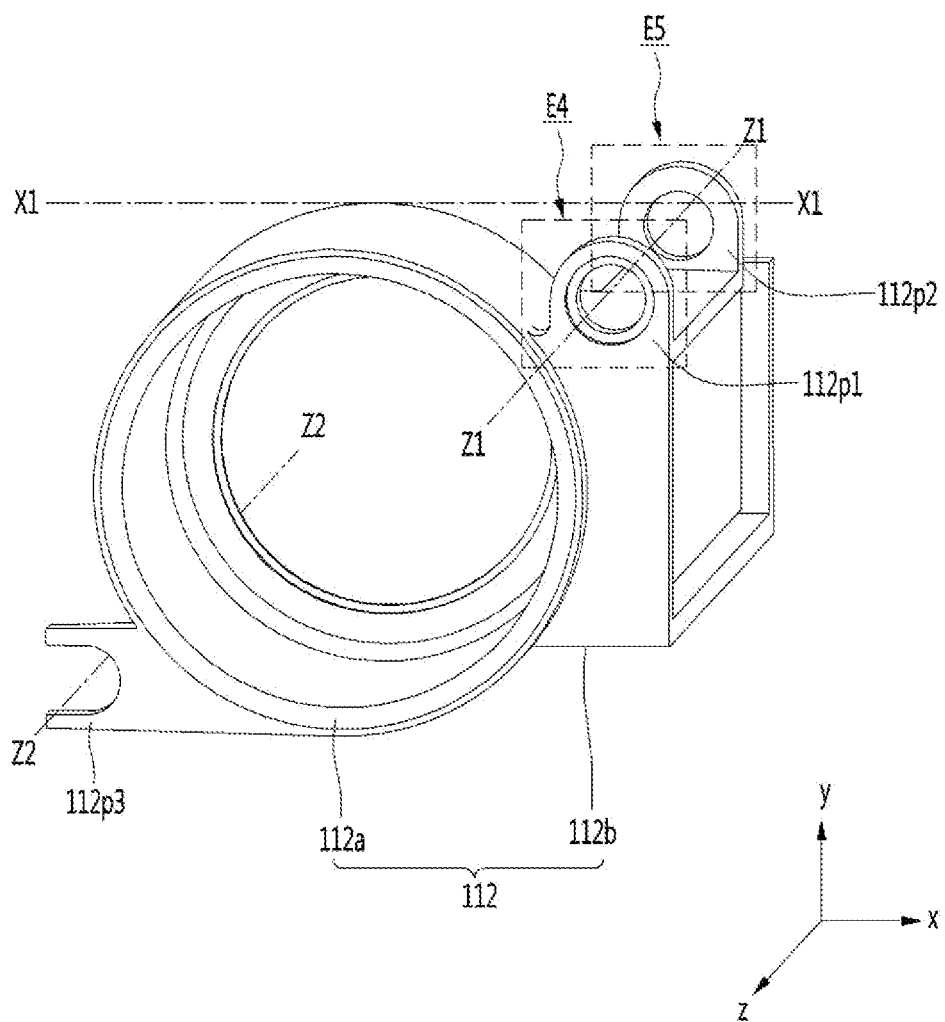

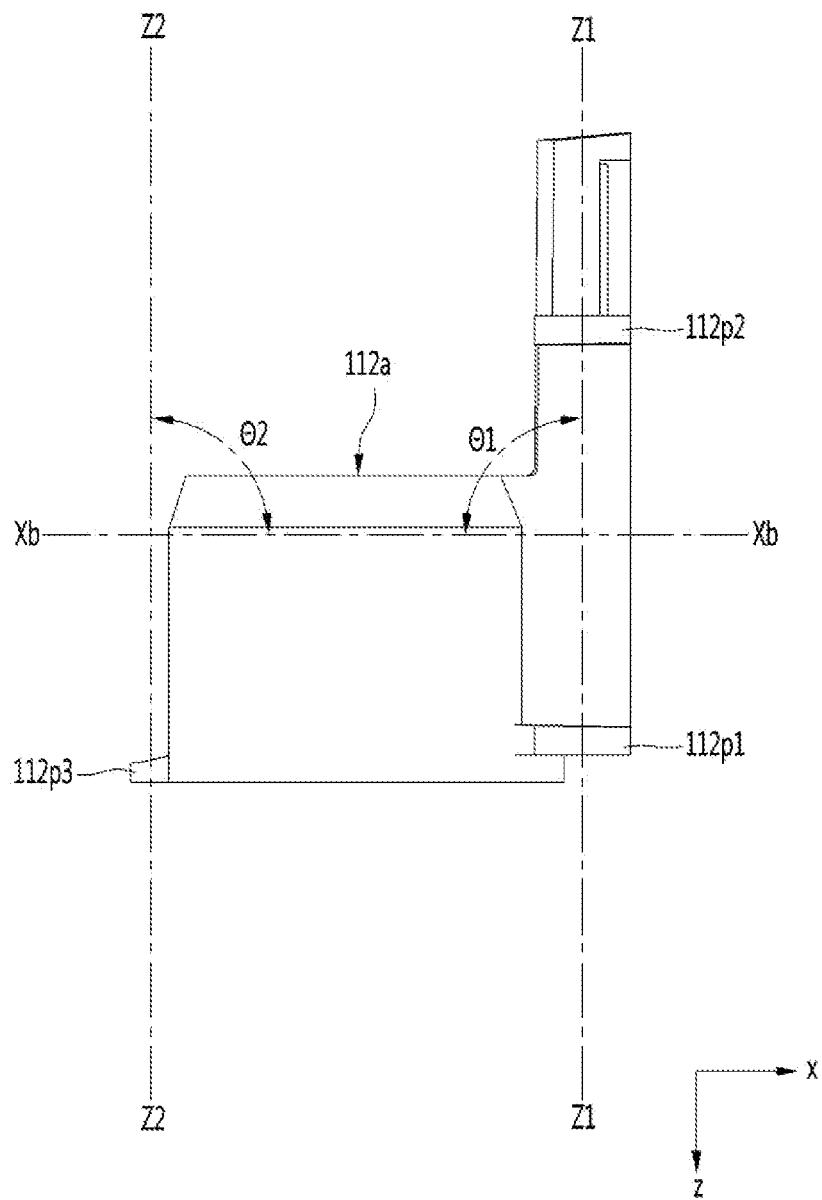
[FIG. 9b]

[FIG. 9c]
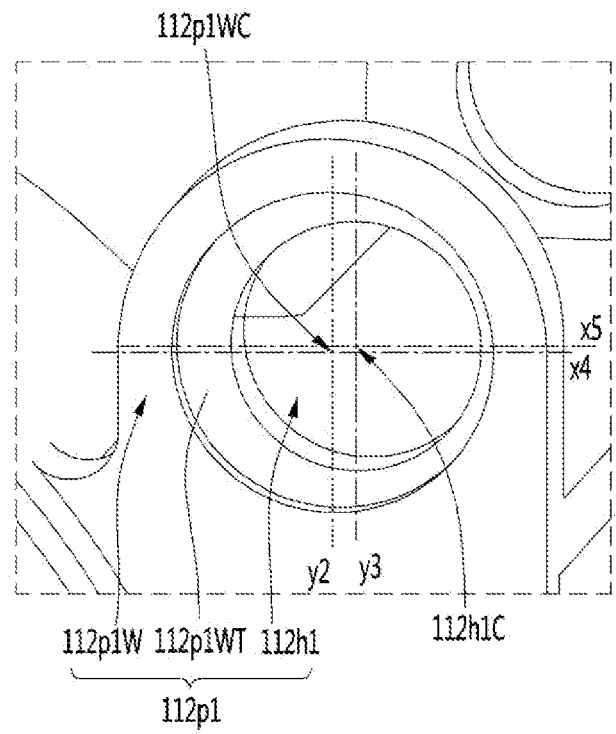
[FIG. 9da]
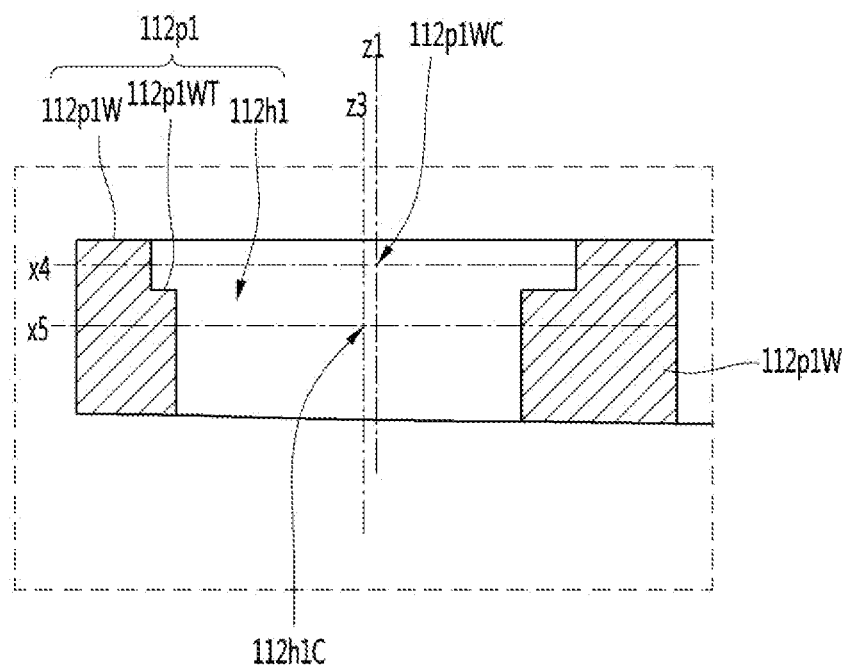

【FIG. 9db】
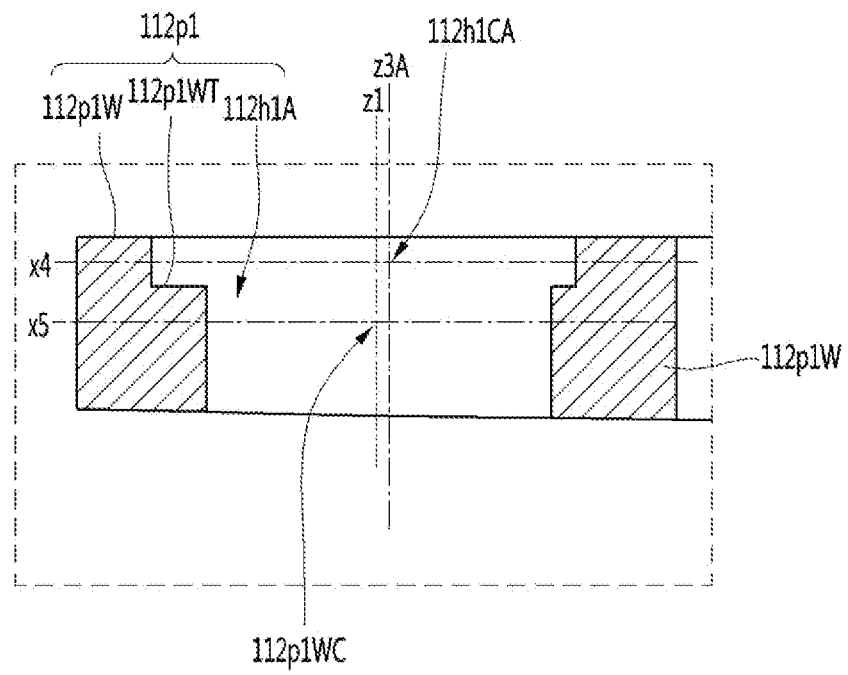
【FIG. 9dc】
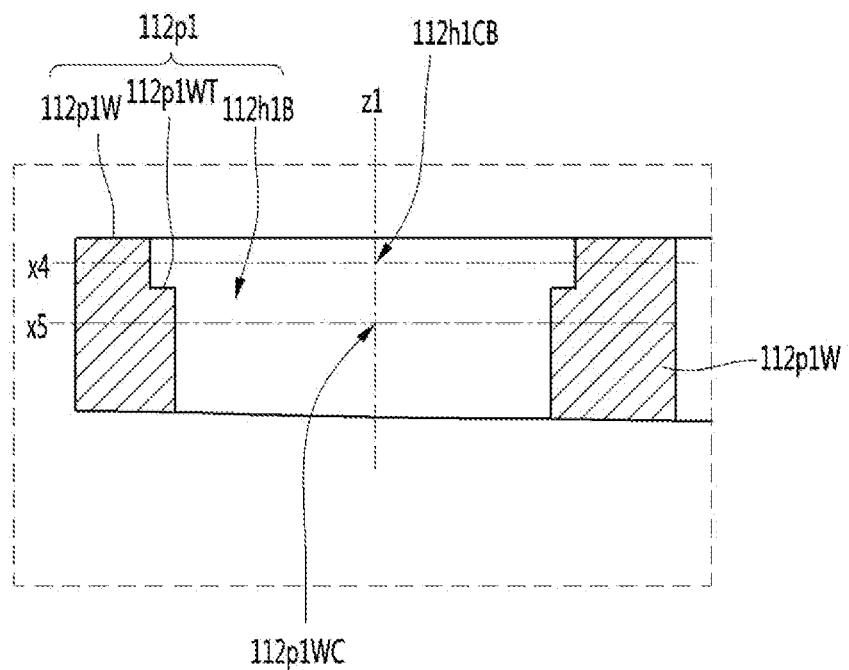

[FIG. 9ea]
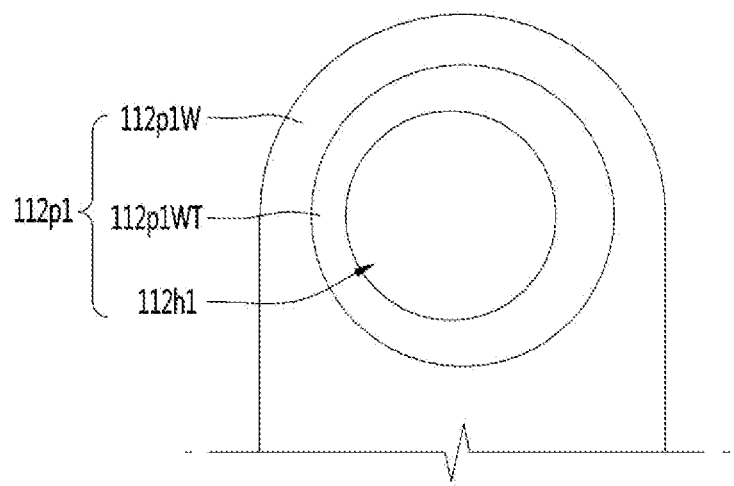
[FIG. 9eb]
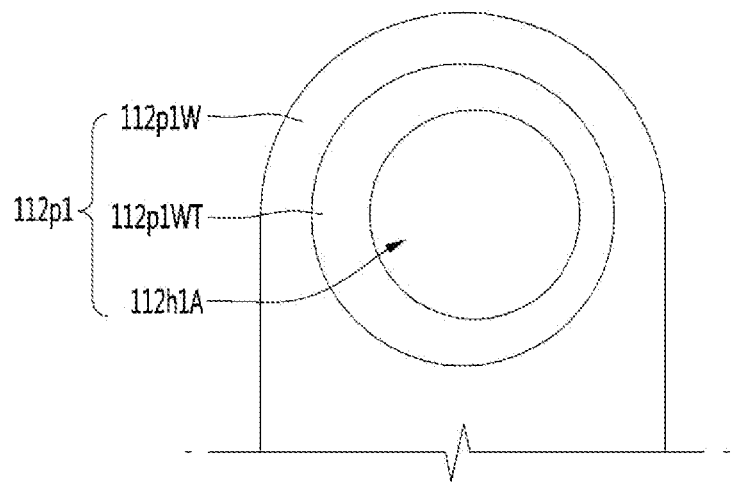
[FIG. 9ec]
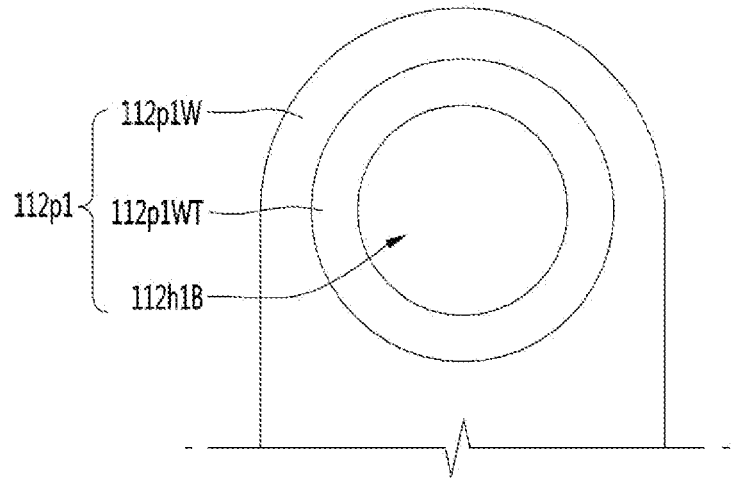

[FIG. 9fa]
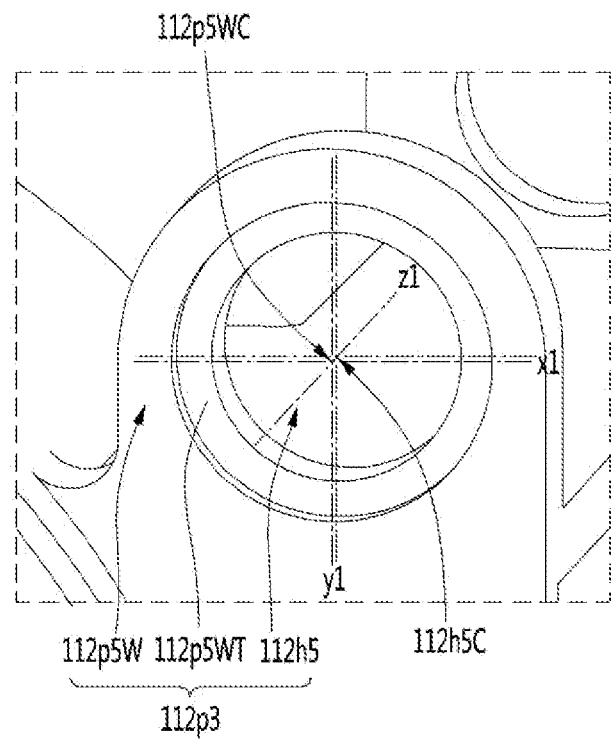
[FIG. 9fb]
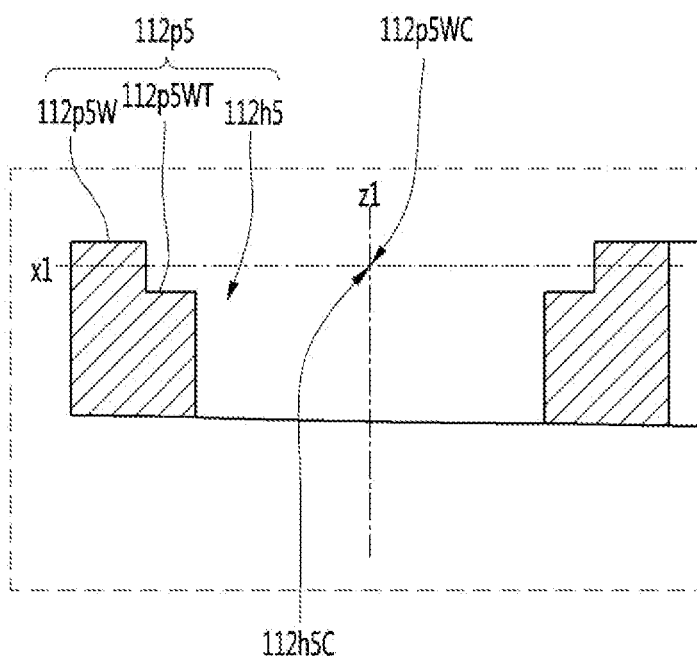

[FIG. 9g]
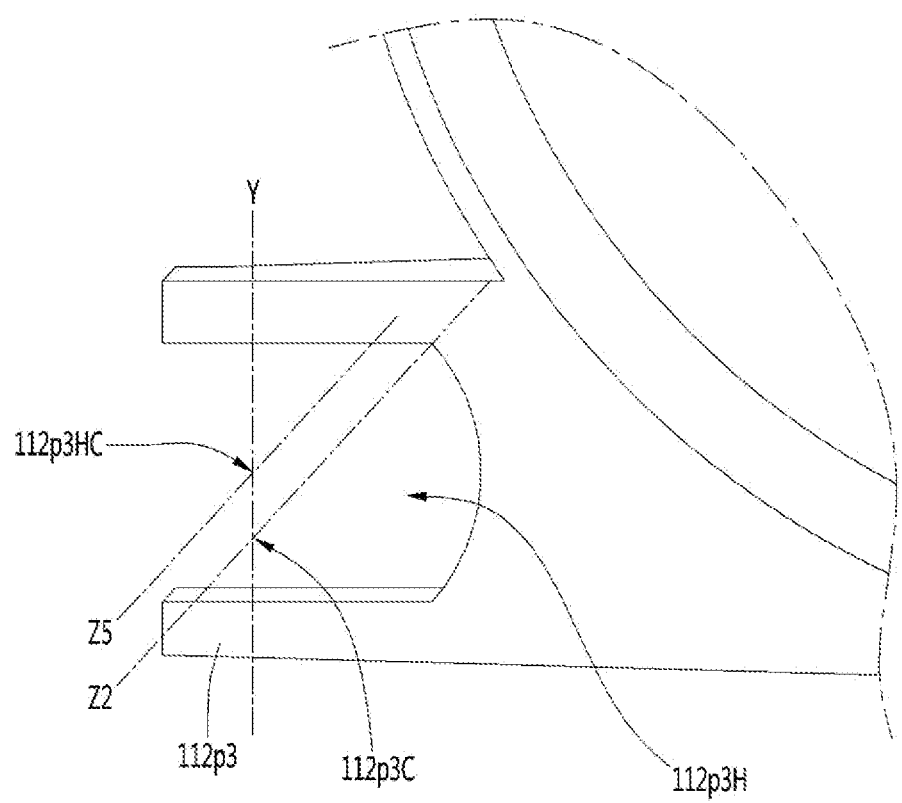

【FIG. 10a】
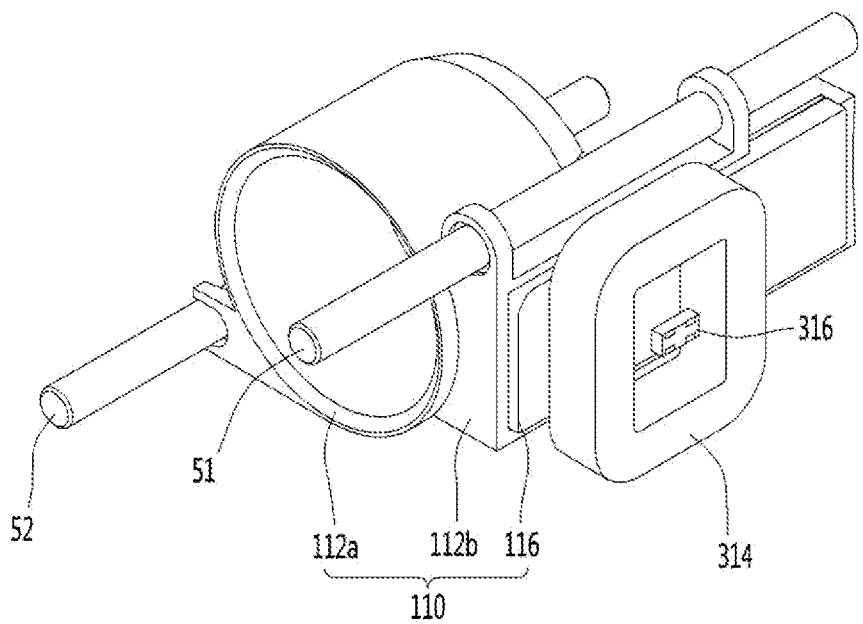
【FIG. 10b】
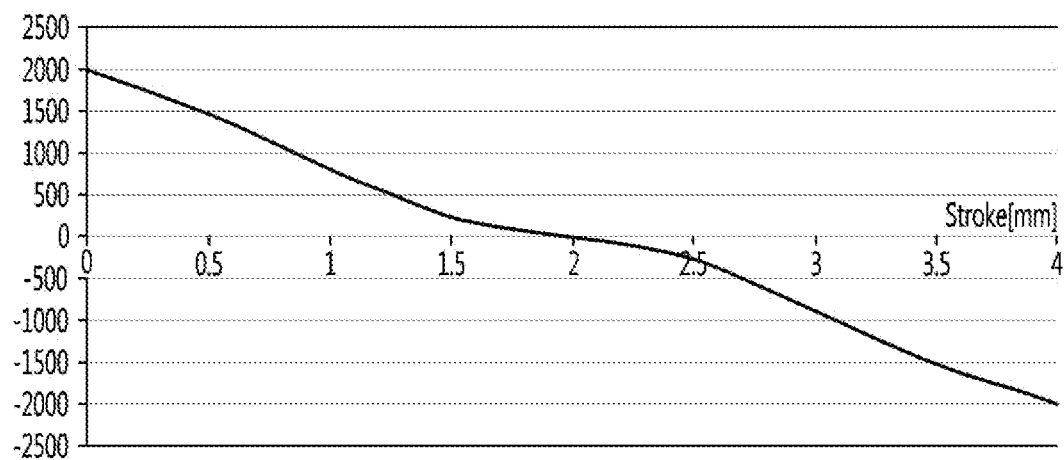

CAMERA ACTUATOR AND CAMERA MODULE INCLUDING THE SAME

CROSS REFERENCE TO RELATED APPLICATIONS

This application is the National Phase of PCT International Application No. PCT/KR2019/014392, filed on Oct. 29, 2019, which claims priority under 35 U.S.C. 119(a) to Patent Application No. 10-2018-0136996, filed in the Republic of Korea on Nov. 9, 2018, all of which are hereby expressly incorporated by reference into the present application.

TECHNICAL FIELD

The embodiment relates to a camera actuator and a camera module including the same. Specifically, the embodiment relates to a zoom actuator and a camera module including the same, but is not limited thereto.

BACKGROUND ART

A camera module performs a function of photographing a subject and storing it as an image or video, and is mounted on a mobile terminal such as a mobile phone, a laptop computer, a drone, or a vehicle, etc.

On the other hand, portable devices such as smartphones, tablet PCs, and laptops have built-in micro camera modules, and these camera modules have an autofocus function that aligns a focal length of the lens by automatically adjusting the distance between the image sensor and the lens.

Recently, camera modules can perform a zooming function of zooming up or zooming out by increasing or decreasing a magnification of a distant subject through a zoom lens. There is an increasing demand for high magnification zooming that is more than twice that of a camera module.

Meanwhile, a zoom actuator is used for the zooming function in the camera module. However, friction torque is generated when the lens is moved due to the mechanical movement of the actuator such that there are technical problems such as a decrease in driving force, an increase in power consumption, or a decrease in control characteristics are caused by such friction torque.

In particular, in order to achieve the best optical characteristics using a plurality of zoom lens groups in a camera module, alignment between a plurality of lens groups and alignment between a plurality of lens groups and an image sensor must be well matched. However, if a decenter in which the spherical center between the lens groups is deviated from the optical axis, a tilt, which is a lens inclination phenomenon, or a phenomenon in which the central axis of the lens group and the image sensor are not aligned, the angle of view changes or defocus occurs, resulting in adversely affecting image quality or the resolution.

Meanwhile, in order to reduce the friction torque resistance when the lens is moved for the zooming function in the camera module, a separation distance in the area where friction is generated can be increased. However, these attempts result in contradicting the technical problem that the lens decenter or the lens tilt is deepened when the zoom movement or the reversal of the zoom movement occurs.

In addition, there is a problem in that it is difficult to implement a zooming function applied in a general large camera because there is a space limitation for zooming because the compact camera module has a size limitation. For example, as a height of a mobile phone becomes slim, there are strict restrictions on the thickness of the lens.

On the other hand, the content described in the item merely provides background information on the embodiment of the applied invention, and does not constitute a prior art.

DISCLOSURE

Technical Problem

One of the technical problems of the embodiment is to provide a camera actuator and a camera module including the same, capable of preventing a phenomenon in which the lens decenter or lens tilt, the center of the lens and the central axis of the image sensor do not coincide when the lens is moved through zooming in the camera module.

In addition, one of the technical problems of the embodiment is to provide a camera actuator and a camera module including the same, capable of preventing occurrence of friction torque when a lens is moved through zooming in the camera module.

In addition, one of the technical problems of the embodiment is to provide a camera actuator and a camera module including the same that can smoothly perform a zooming function even in a very small and compact camera module.

The technical problem of the embodiment is not limited to that described in this item, and includes what can be inferred from the entire description of the invention.

Technical Solution

The camera actuator according to the embodiment may include a base 22, a lens assembly 110 disposed on the base 22, a guide pin 51 coupled to the base 22 and guiding the lens assembly, and a body 25 coupled to the base 22, a cover 21 coupled to the body, a base pin coupling part disposed on the base and coupled to one side of the guide pin 51, and disposed on the cover, a cover pin coupling part coupled to the other side of the guide pin 51 and a pin guide part disposed on the lens assembly and guiding the guide pin.

In an embodiment, the base pin coupling part may include a first coupling groove 21h1H, the cover pin coupling part 21h1 may include a first groove 21h1H, the pin guide part may include a first hole and a second hole having a size different from that of the first hole.

In an embodiment, at least one of a central axis of the base pin coupling part, a central axis of the cover pin coupling part, and a central axis of the first hole can be spaced apart from a central axis of the first coupling groove or a central axis of the first groove or a central axis of the second hole.

The cover pin coupling part 21h1 may include a first groove 21h1H and a second groove 21h1W having a size different from the first groove, for example, a length having a different diameter.

A center 21h1C of the first groove 21h1H may be disposed to be spaced apart from a center 21h1WC of the second groove.

The first groove and the second groove of the cover may have a circular shape.

A size of the first groove of the cover may be smaller than a size of the second groove of the cover. The size may mean a size of the diameter.

The second groove of the cover may be formed by an inclined surface.

The first pin coupling part is formed to protrude from the cover, and the first groove and the second groove of the cover may be formed in the first pin coupling part protruding from the cover.

A length of the first groove of the cover in the optical axis direction may be longer than a length of the second groove of the cover in the optical axis direction.

The guide pin and the first pin coupling part of the cover may be included as at least one or more thereinto.

The base and the body may be integrally formed.

In addition, the camera actuator according to the embodiment may include a base 22, a lens assembly 110 disposed on the base 22, and a guide pin 51 coupled to the base 22 and guiding the lens assembly.

The base may include base pin coupling parts 22$h$3 and 22$h$4 coupled to the guide pin 51.

The base pin coupling part 22$h$4 may include a first coupling groove 22$h$4H and a second coupling groove 22$h$4W having a size different from that of the first coupling groove.

A center of the first coupling groove 22$h$4H may be disposed to be spaced apart from a center of the second coupling groove 22$h$4W.

The first coupling groove 22$h$4H and the second coupling groove 22$h$4W of the base may have a circular shape, and a size of the first coupling groove of the base may be smaller than a size of the second coupling groove of the base.

The second coupling groove of the base may be formed by an inclined surface.

The base pin coupling part can be formed to protrude from the base, and the first coupling groove and the second coupling groove of the base may be formed in the base pin coupling parts 22$h$3 and 22$h$4 protruding from the base.

A length of the first coupling groove of the base in the optical axis direction may be longer than a length of the second coupling groove of the base in the optical axis direction.

The guide pin and the base pin coupling part may be at least one or more.

The body may include a first protrusion and a second protrusion protruding from the body, and the base may include a first base groove and a second base groove at positions corresponding to the first protrusion and the second protrusion, and a size of the first base groove may correspond to a size of the first protrusion, and a size of the second base groove may be larger than a size of the second protrusion.

The second base groove of the base may extend in the direction of the first base groove.

In addition, the camera actuator according to the embodiment may include a base 22, a lens assembly 110 disposed on the base 22, and a guide pin 51 coupled to the base 22 and guiding the lens assembly.

The lens assembly 110 may include a lens housing and a pin guide part, and the pin guide part may include a first hole 112$h$1 through which the guide pin 51 is guided and a second hole 112$p$1WT having a size different from that of the first hole.

A center 112$h$1$c$ of the first hole may be disposed to be spaced apart from a center 112$p$1WC of the second hole.

The first hole of the lens assembly and the second hole of the lens assembly may have a circular shape, and a size of the first hole of the lens assembly may be smaller than a size of the second hole.

A length of the first hole of the lens assembly in the optical axis direction may be longer than a length of the second hole of the lens assembly in the optical axis direction.

The guide pin and the pin guide part of the lens assembly may be at least one or more.

In addition, the actuator according to the embodiment may include a base 22, a lens assembly 110 disposed on the base 22, and a guide pin 51 coupled to the base 22 and guiding the lens assembly.

The base 22 may include a body 25 and a cover 21 disposed on one side of the body 25, and the cover 21 is a pin coupling part 21$h$1 coupled to the guide pin 51.

The pin coupling part 21$h$1 may include a coupling groove 21$h$1H.

A center 21$h$1C of the coupling groove 21$h$1H may be disposed to be spaced apart from a center of the pin coupling part 21$h$1.

The base may include a base pin coupling part 22$h$4 coupled to the guide pin 51, the base pin coupling part 22$h$4 includes a fourth coupling groove 22$h$4H, and a center of the fourth coupling groove 22$h$4H may be disposed to be spaced apart from a center of the base pin coupling part 22$h$4.

The lens assembly 110 may include a lens housing and a driving unit housing, and the driving unit housing may include a pin guide unit 112$p$1.

The pin guide part 112$p$1 may include a first hole 112$h$1 through which the guide pin 51 is guided, and a center 112$h$1$c$ of the first hole is spaced apart from the center 112$p$WC of the pin guide part 112$p$1.

The driving part housing may include a pin guide groove 112$p$3H, and the pin guide grooves may be spaced apart in a vertical direction and disposed eccentrically.

In addition, the camera actuator according to the embodiment may include a base 22, a lens assembly 110 disposed on the base 22, and a guide pin 51 coupled to the base 22 and guiding the lens assembly.

The driving part housing may include a pin guide part 112$p$1, and the pin guide part 112$p$1 may include a first hole 112$h$1 through which the guide pin 51 is guided.

The center 112$h$1$c$ of the pin hole may be disposed to be spaced apart from the center 112$p$WC of the pin guide part 112$p$1.

The driving part housing may include a pin guide groove 112$p$3H, and the pin guide grooves may be spaced apart in a vertical direction and disposed eccentrically.

The base 22 may include a body 25 and a cover 21 disposed on one side of the body 25.

The cover 21 may include a pin coupling part 21$h$1 coupled to the guide pin 51, and the pin coupling part 21$h$1 may include a coupling groove 21$h$1H.

The center 21$h$1C of the coupling groove 21$h$1H may be disposed to be spaced apart from the center of the pin coupling part 21$h$1.

The base may include a base pin coupling part 22$h$4 coupled to the guide pin 51, and the base pin coupling part 22$h$4 may include a fourth coupling groove 22$h$4H.

The center of the fourth coupling groove 22$h$4H may be disposed to be spaced apart from the center of the base pin coupling part 22$h$4.

The lens assembly, the guide pin, the cover pin coupling part, and the base pin coupling part may be at least one or more.

The pin guide part and the pin guide groove may be at least one or more.

The base and the body may be integrally formed.

The base 22 may include a first base groove 22$p$h1 and a second base groove 22$p$h2, and the second-first hole and the second-second hole may be coupled to a first protrusion and a second protrusion protruding from the body respectively.

And the second base groove may have a size having a larger cross-sectional area than that of the second protrusion.

The second base groove may have a length extending in the direction of the first base groove.

The camera actuator according to the embodiment may include a base unit 20, at least one lens assembly 110 and 120 disposed on the base unit 20, and a guide pin 50 coupled to the base unit 20 and guiding the lens assembly.

The base unit 20 may include a body 25, a cover 21 disposed on one side of the body 25, and a base 22 disposed on the other side. In addition, the base 22 may include a body 25 and a cover 21.

The cover 21 may include a first pin coupling part 21$h$1 and a second pin coupling part 21$h$2 coupled to the guide pin 50.

The first pin coupling part 21$h$1 may include a protruding first outer wall 21$h$1W and a first groove 21$h$1H disposed inside the first outer wall 21$h$1W. The protruding first outer wall 21$h$1W may have a circular shape.

The center 21$h$1C of the first groove 21$h$1H of the first pin coupling part 21$h$1 is a circular center 21$h$1WC formed by the first outer wall 21$h$1W of the first pin coupling part 21$h$1 and can be spaced apart and arranged eccentrically.

The cover 21 may include a first hook 21$p$1 and a second hook 21$p$2 protruding toward the body 25 and spaced apart from each other.

The center 21$h$1C of the first pin coupling part 21$h$1 may be eccentrically disposed to be spaced apart from the second y-axis y2 passing through the center of the second hook 21$p$2 of the cover.

The first pin coupling part 21$h$1 may include a chamfer 21$h$1WS between an upper end of the first outer wall 21$h$1W and an upper end of the first groove 21$h$1H.

The base 22 may include a base pin coupling part coupled to the guide pin 50. For example, the base pin coupling part may include a third pin coupling part 21$h$3 and a fourth pin coupling part 21$h$4.

The fourth pin coupling part 22$h$4 may include a protruding second coupling groove 21$h$4W and a first coupling groove 22$h$4H disposed inside the second coupling groove 21$h$4W. The protruding second coupling groove 21$h$4W may have a circular shape.

In the fourth pin coupling part 22$h$4, the center of the circular shape formed by the second coupling groove 21$h$4W and the center of the fourth coupling groove 22$h$4H may be eccentrically arranged to be spaced apart from each other.

A depth of the third coupling groove 22$h$3H of the third pin coupling part 22$h$3 disposed on the base 22 or a depth of the fourth coupling groove 22$h$4H of the fourth pin coupling part 22$h$4H can be different from a depth of the first groove 21$h$1H of the first pin coupling part 21$h$1 disposed on the cover 21 or a depth of the second pin coupling groove 21$h$2H of the second pin coupling part 21$h$2H.

A depth of the third coupling groove 22$h$3H of the third pin coupling part 22$h$3 disposed on the base 22 or a depth of the fourth coupling groove 22$h$4H of the fourth pin coupling part 22$h$4H can be deeper than a depth of the first groove 21$h$1H of the first pin coupling part 21$h$1 disposed on the cover 21 or a depth of the second coupling groove 21$h$2H of the second pin coupling part 21$h$2.

The base 22 may have a first base groove 22$ph$1 and a second base groove 22$ph$2, and can be combined with a first coupling protrusion and a second coupling protrusion protruding from the body 25 toward the base 22 respectively.

The first base groove 22$ph$1 of the base 22 may have a size corresponding to the shape of the first coupling protrusion, and the second base groove 22$ph$2 may have a larger cross-sectional area than the second coupling protrusion.

In an embodiment, the lens assemblies 110 and 120 may include a lens housing and a driving unit housing, and the driving unit housing may include a first pin guide unit 112$p$.

The first pin guide part 112$p$1 may include a first guide wall 112$p$1W and a first hole 112$h$1 disposed inside the first guide wall 112$p$1W.

The center 112$h$1c of the first hole of the first pin guide part 112$p$1 may be eccentrically disposed to be spaced apart from the center 112$p$WC of the first guide wall 112$p$1W of the first pin guide part 112$p$1.

The embodiment may include a first driving unit 310 for driving the lens assembly 110, 120, the first driving unit 310 may include a first yoke 312 and a first coil unit 312, and the first driving unit 310 may further include a first Hall sensor 316 inside the first coil unit 312.

The camera module of the embodiment may include the actuator and an image sensor unit disposed at one side of the actuator.

Advantageous Effects

The camera actuator and the camera module including the same according to the embodiment can solve the problem of lens decenter or tilt when zooming, so that the alignment between the plurality of lens groups can be well aligned and the angle of view can be improved. So, there is a technical effect of remarkably improving image quality or resolution by preventing changes or out of focus.

For example, according to an embodiment, in order to increase a precision of lens alignment between the plurality of lens groups, a center of the first guide pin coupling part can be eccentrically arranged to increase a precision of alignment between the lens groups, such that there is a technical effect of minimizing decenter or lens tilt.

In addition, according to the embodiment, a center of the first groove can be eccentrically disposed so that the center of the first groove can be spaced apart from a center of a circular shape formed by a first outer wall in order to increase an accuracy of lens alignment between the plurality of lens groups, thereby improving the accuracy of alignment between the lens groups. So, there is a technical effect that can minimize decenter or tilt of the lens during zooming.

Next, according to the embodiment, there is a technical effect capable of solving the problem of generating friction torque during zooming.

For example, according to the embodiment, by removing the area other than the first pin guide and the second pin guide from the upper area of the first driving housing where the first guide pin is located, friction can be reduced by reducing the weight of the first driving housing. By reducing the torque and reducing the frictional resistance, there are technical effects such as improvement of driving force during zooming, reduction of power consumption, and improvement of control characteristics.

Accordingly, according to the embodiment, while minimizing the friction torque during zooming, it is possible to prevent the occurrence of a phenomenon in which the decenter or tilt of the lens or the central axis of the lens group and the image sensor are not aligned. Therefore, there is a complex technical effect that can significantly improve image quality or resolution.

Next, according to the embodiment, there is a technical effect that the zooming function can be smoothly performed even in a compact camera module. For example, according to the embodiment, there is a technical effect that a compact camera module can be implemented by arranging the Hall sensor in the inner area of the first coil to reduce the area occupied by the Hall sensor.

The technical effects of the embodiments are not limited to those described in this item, and include those that can be inferred from the entire description of the invention.

DESCRIPTION OF DRAWINGS

FIG. 1 is a perspective view of a camera module according to an embodiment.

FIG. 2 is a first exploded perspective view of the camera module according to the embodiment shown in FIG. 1.

FIG. 3 is a perspective view of the camera module according to the embodiment shown in FIG. 1 in which a base body, a cover, and a base are removed.

FIG. 4A is a perspective view of a first lens assembly and a first driving unit in the camera module according to the embodiment shown in FIG. 3.

FIG. 4B is an exemplary diagram illustrating interaction between a first magnet and a first coil unit in the camera module according to the embodiment shown in FIG. 4A.

FIG. 5 is a plan view of a first lens assembly and a guide pin shown in FIG. 4A.

FIG. 6A is a second exploded perspective view of the camera module according to the embodiment shown in FIG. 2.

FIG. 6B is a front view of a cover in the camera module according to the embodiment shown in FIG. 6A.

FIG. 7A is an enlarged view of a first part of a cover in the camera module according to the embodiment shown in FIG. 6B.

FIG. 7B is a cross-sectional view of a first part of a cover in the camera module according to the embodiment shown in FIG. 7A.

FIG. 7C is an enlarged view of a second part of the cover in the camera module according to the embodiment shown in FIG. 6B.

FIG. 7D is a cross-sectional view of a second part of a cover in the camera module according to the embodiment shown in FIG. 7C.

FIG. 7E is another cross-sectional view of the second area E2 of the cover in the camera module according to the embodiment shown in FIG. 7D.

FIG. 8A is a front view of a base in the camera module according to the embodiment shown in FIG. 2.

FIG. 8B is an enlarged view of a third part of the base in the camera module according to the embodiment shown in FIG. 8A.

FIG. 9A is a perspective view of a first lens assembly in the camera module according to the embodiment shown in FIG. 4A.

FIG. 9B is a plan view of a first lens assembly in the camera module according to the embodiment shown in FIG. 9A.

FIG. 9C is a partial fourth enlarged view of the first lens assembly in the camera module according to the embodiment shown in FIG. 9A.

FIGS. 9DA to 9DC are cross-sectional views of a fourth enlarged partial view of the first lens assembly in the camera module according to the embodiment shown in FIG. 9C.

FIGS. 9EA to 9EC are front views of a partial fourth enlarged view of the first lens assembly in the camera module according to the embodiment shown in FIGS. 9DA to 9DC.

FIG. 9FA is a fifth enlarged view of the first lens assembly in the camera module according to the embodiment shown in FIG. 9A.

FIG. 9FB is a cross-sectional view of a fifth enlarged partial view of the first lens assembly in the camera module according to the embodiment shown in FIG. 9FA.

FIG. 9G is an enlarged view of another embodiment of a pin guide part of the first lens assembly in the camera module according to the embodiment shown in FIG. 9A.

FIG. 10A is a partial perspective view of the camera actuator shown in FIG. 4.

FIG. 10B Is a graph showing Hall sensor linearity according to a stroke of the camera actuator shown in FIG. 10A.

MODE FOR INVENTION

Hereinafter, embodiments will be described in detail with reference to the accompanying drawings.

On the other hand, in the description of the embodiment, in the case where it is described as being formed in "up/down" or "above/below" of each element, includes both two components directly contacting each other, or one or more other configurations formed indirectly between the two configurations. In addition, when expressed as "up/down" or "above/below", it may include not only an up direction but a down direction based on one configuration.

In addition, the relational terms such as "upper/upper portion/up" and "lower/lower portion/down", etc., used below, do not require or imply any physical or logical relationship or order between such components or elements, it may be used to distinguish one component or element from another component or element.

In addition, in the description of the embodiment, terms such as "first" and "second" may be used to describe various elements, but these terms are used for the purpose of distinguishing one element from other elements. In addition, terms specifically defined in consideration of the configuration and operation of the embodiment are only for describing the embodiment, and do not limit the scope of the embodiment.

Embodiment

FIG. 1 is a perspective view of a camera module 100 according to an embodiment, and FIG. 2 is a first exploded perspective view of the camera module 100 according to the embodiment shown in FIG. 1.

In the xyz axis direction shown in FIGS. 1 and 2, the z axis means the optical axis direction or a direction parallel thereto, the xz plane represents the ground, and the x axis is a direction perpendicular to the z axis in the ground (xz plane). And the y-axis may mean a direction perpendicular to the ground.

Referring to FIG. 1, the camera module 100 according to the embodiment may include a base unit 20, a circuit board 350 disposed outside the base unit 20, and a first driving unit 310.

The base unit 20 may include a body 25, a cover 21 disposed on one side of the body 25, and a base 22 disposed on the other side. In addition, the base 22 may include a body 25 and a cover 21. In addition, the base 22 and the body 25 may be integrally formed.

Referring to FIG. 2, various optical systems such as a first lens assembly 110, a second lens assembly 120 (see FIG. 3), and a third lens group 130 are disposed on the body 25, and a first side of the body 25 may be coupled to the cover 21 to an optical axis (z) direction, and the other side may be coupled to the base 22. A predetermined image sensor unit (not shown) may be disposed in the direction of the base 22.

The material of the base unit 20 may be formed of at least one of plastic, glass-based epoxy, polycarbonate, metal, or composite material.

In the embodiment, the base unit 20 may be designed in a master barrel structure that surrounds the entire zoom module to prevent foreign matter, block light, fix pins, and fix the lens, but is not limited thereto. The cover 21 and the base 22 may be fitted in shape with the body 25, or may be coupled by an adhesive.

The base 22 may be formed integrally with the body, and may be fitted in shape with the cover 21 to be coupled by fitting or an adhesive.

In addition, the cover 21 and the base 22 may be coupled to the guide pin 50. For example, the guide pin 50 may include a first guide pin 51 and a second guide pin 52 disposed to be spaced apart parallel to the optical axis. One end of the first guide pin 51 and the second guide pin 52 may be fixed by being coupled to the cover 21 and the other end of the base 22.

In addition, a third lens group 130 (lens not shown) may be disposed on the cover 21. The third lens group 130 may be a fixed lens, but is not limited thereto.

A first lens assembly 110 and a second lens assembly (see FIG. 3) may be disposed inside the body 25.

According to an embodiment, a bottom groove (not shown) in which the first lens assembly 110 and the second lens assembly 120 can move may be formed parallel to the optical axis z direction on the bottom surface of the body 25. The bottom groove may have a downward concave shape according to the outer circumference shape of the lens, but is not limited thereto.

With continued reference to FIG. 2, in an embodiment, the first driving unit 310 and the second driving unit 320 (see FIG. 3) may be disposed on both sides of the body 25 of the base. In addition, circuit boards 350 may be disposed on one or both sides of the body 25 to be electrically connected to lens driving units inside the body 25.

Next, FIG. 3 is a perspective view with the body 25, the cover 21, and the base 22 removed from the camera module 100 according to the embodiment shown in FIGS. 1 and 2, and the lens itself is omitted.

Referring to FIGS. 2 and 3 together, in the camera module 100 according to the embodiment, an optical system and a lens driver may be disposed on the body 25. For example, the camera module 100 according to the embodiment may include at least one of the first lens assembly 110, the second lens assembly 120, the third lens group 130, and the guide pin 50 arranged on the body 25. The first driving unit 310 and the second driving unit 320 may be disposed on the outer shaft of the body 25, and thereby perform a high magnification zooming function.

Meanwhile, the first lens assembly 110, the second lens assembly 120, the third lens group 130, and the image sensor unit may be classified as optical systems.

In addition, the first driving unit 310, the second driving unit 320, and the guide pin 50 may be classified as a lens driving unit, and the first lens assembly 110 and the second lens assembly 120 also function as a lens driving unit. The first driving unit 310 and the second driving unit 320 may be driving units including a coil and a yoke, but are not limited thereto.

Referring to FIG. 3, the guide pin 50 may perform a guide function of a lens assembly to be moved, and may be provided in a single number or in a plurality. For example, the guide pin 50 may include a first guide pin 51 and a second guide pin 52, but is not limited thereto. The guide pin 50 may be referred to as a rod or a shaft, but is not limited thereto.

In an embodiment, a predetermined prism (not shown) may be disposed on the third lens group 130, and a predetermined image sensor unit (not shown) may be disposed on the base 22 side. The prism may also be included in the optical system.

In an embodiment, the prism may change incident light into parallel light. For example, the prism may change the incident light into parallel light by changing the optical path of the incident light to an optical axis (z-axis) parallel to the central axis of the lens group. Thereafter, the parallel light may pass through the third lens group 130, the first lens assembly 110, and the second lens assembly 120 and enter the image sensor unit to capture an image.

The prism may be an optical member having a triangular column shape. In addition, in the embodiment, a reflector or a reflective mirror may be used instead of or in addition to the prism.

In addition, in the embodiment, when the image sensor unit is not disposed in a direction perpendicular to the optical axis, an additional prism (not shown) may be provided so that light that has passed through the lens group is captured by the image sensor unit.

In an embodiment, the image sensor unit may be disposed perpendicular to the optical axis direction of parallel light. The image sensor unit may include a solid-state imaging device disposed on a predetermined second circuit board (not shown). For example, the image sensor unit may include a Charge Coupled Device (CCD) image sensor or a Complementary Metal-Oxide-Semiconductor (CMOS) image sensor.

In the following description of the embodiment, a case of two moving lens groups is described, but the number of moving lens groups is not limited thereto, and there may be three, four, or five or more moving lens groups. In addition, the optical axis direction z may mean a direction that is the same as or parallel to the direction in which the lens groups are aligned.

With continued reference to FIGS. 2 and 3, the camera module according to the embodiment may perform a zooming function. For example, in the embodiment, the first lens assembly 110 and the second lens assembly 120 are moving lenses that move through the first driving unit 310, the second driving unit 320, and the guide pin 50. And the third lens group 130 (see FIG. 2) may be a fixed lens, but is not limited thereto.

In this case, the third lens group 130 may perform a function of a focator for forming parallel light at a specific position.

Next, the first lens assembly 110 may perform a variable function of re-forming an image formed by the third lens group 130 as a concentrator to another location. Meanwhile, in the first lens assembly 110, the magnification change may be large due to the large change in the distance or the image distance to the subject.

On the other hand, the image point of the image in the first lens assembly 110 that is a variable factor may be slightly different depending on the location.

Accordingly, the second lens assembly 112 may perform a position compensation function for an image formed by a variable power factor. For example, the second lens assembly 120 may perform a function of a compensator that performs a role of accurately imaging a position imaged by the first lens assembly 110, which is a variable factor, at the position of the actual image sensor unit.

In an embodiment, the actuator may include a mover and a fixing part. The mover is a concept corresponding to a fixed part and may be referred to as a moving part. For example, the mover may refer to the first and second lens assemblies 110 and 120 that are moved through the guide pin 50. On the other hand, the fixing unit may mean the base unit 20, the guide pin 50, the first driving unit 310, the second driving unit 320, etc. that are not moved.

With continued reference to FIG. 3, in an embodiment, one or more guide pins 50 may be disposed parallel to the optical axis (z-axis). For example, the guide pin 50 may include a first guide pin 51 and a second guide pin 52 that are spaced apart from each other in parallel to the optical axis direction. The first guide pin 51 and the second guide pin 52 are disposed on the pin guide parts 112h1, 112h2, and 112r1, and are coupled to the cover 21 and the base 22 of the base (see FIGS. 1, 2) The first lens assembly 110 and the second lens assembly 120 may function as a movement guide. The guide pin 50 may be formed of at least one of plastic, glass-based epoxy, polycarbonate, metal, or composite material, but is not limited thereto.

Next, in the embodiment, the first lens assembly 110 and the second lens assembly 120 may be driven by electromagnetic force due to interaction with the first driving unit 310 and the second driving unit 320, respectively, but are not limited thereto.

The first driving unit 310 and the second driving unit 320 may be driving units having a coil and a yoke. For example, the first driving unit 310 may include a first yoke 312 and a first coil unit 314, and the second driving unit 320 may include a second yoke 322 and a second coil unit 324.

In addition, the first lens assembly 110 of the embodiment may include one or more of the first housing 112, the first lens group (not shown), and the first magnet 116. The first housing 112 may include a first lens housing 112a accommodating a first lens group (not shown) and a first driving unit housing 112b accommodating the first magnet 116. The lens housing may be referred to as a lens barrel, but is not limited thereto.

In addition, the first housing 112 further includes a first-second yoke (not shown) under the first magnet 116 inside the first driving unit housing 112b, so that the magnetic force of the first magnet 116 can be blocked not to affect inwardness of the body 25.

In addition, the second lens assembly 120 of the embodiment may include one or more of the second housing 122, a second lens group (not shown), and the second magnet 126. The second housing 122 may include a second lens housing 122a accommodating the second lens group (not shown) and a second driving unit housing 122b accommodating the second magnet 126. In addition, the second lens housing 122a may include a fifth pin guide part 122p5 fitted to the first guide pin 51.

In addition, the second housing 122 may further include a second-second yoke (not shown) under the second magnet 126 inside the second driving unit housing 122b such that it is possible to block the magnetic force of the second magnet 126 from affecting the inside of the body 25.

Hereinafter, the first lens assembly 110 will be described with reference to FIG. 4A.

FIG. 4A is a perspective view of a first lens assembly 110 and a first driving unit 310 in the camera module according to the embodiment shown in FIG. 3, and FIG. 4B is an example of interaction between the first magnet 116 and the first coil unit 314 in the camera module according to the embodiment shown in FIG. 4A.

Referring to FIG. 4A, the first lens assembly 110 may include a first lens housing 112a and a first driving unit housing 112b. The first lens housing 112a functions as a barrel or a container, and a first lens group (not shown) may be mounted. The first lens group (not shown) may be a moving lens group, and may include a single lens or a plurality of lenses. The second housing 122 of the second lens assembly 120 may also include a second lens housing 122a and a second driving unit housing 122b.

Next, a first magnet 116 may be disposed on the first driving part housing 112b of the first lens assembly 110.

The first magnet 116 of the first lens assembly 110 may be a magnet driving unit, but is not limited thereto. For example, the first magnet 116 may include a first magnet that is a permanent magnet. In addition, the second driving unit 126 of the second lens assembly 120 may also be a magnet driving unit, but is not limited thereto.

With reference to FIG. 4B for a moment, an interaction in which an electromagnetic force DEM is issued between the first magnet 116 and the first coil unit 314 in the camera module according to the embodiment will be described.

As shown in FIG. 4B, in the camera module according to the embodiment, the magnetization camera actuator according to the first magnet 116 may be a vertical magnetization method. For example, in the embodiment, both the N-pole 116N and the S-pole 116S of the first magnet 116 may be magnetized to face the first coil unit 314. Accordingly, the N-pole 116N and the S-pole 116S of the first magnet 116 may be disposed so as to correspond to a region in which the current flows in the y-axis direction perpendicular to the ground in the first coil unit 314.

Referring to FIG. 4B, in an embodiment, a magnetic force DM is applied in a direction opposite to the x-axis at the N pole 116N of the first magnet 116. When the current DE flows in the y-axis direction in the region of the first coil part 312 corresponding to the N pole 116N, the electromagnetic force DEM acts in the z-axis direction according to Fleming's left-hand rule.

In addition, in the embodiment, a magnetic force DM is applied in the x-axis direction from the S pole 116S of the first magnet 126. When the current DE flows in the direction opposite the y-axis perpendicular to the ground in the first coil part 312 corresponding to the S pole 116S, the electromagnetic force DEM acts in the z-axis direction according to Fleming's left-hand rule.

At this time, since the first driving unit 310 including the first coil unit 314 is in a fixed state, the first lens assembly 110, which is a mover in which the first magnet 116 is disposed, has an electromagnetic force DEM according to the current direction. By this, it can be moved back and forth in a direction parallel to the direction of the z-axis. The electromagnetic force DEM may be controlled in proportion to the current DE applied to the first coil unit 314.

Similarly, in the camera module according to the embodiment, electromagnetic force DEM is generated between the second magnet 126 and the second coil unit 324 so that the second lens assembly 120 may be moved horizontally with respect to the optical axis.

Referring back to FIG. 4A, in the embodiment, the first driving unit housing 112b may guide the first lens assembly 110 in the optical axis direction by having at least one pin guide unit 112p. In an embodiment, the pin guide part 112p may include the first pin guide part 112p1 and the second pin guide part 112p2.

For example, the first driving part housing 112b may include a first pin guide part 112p1 protruding upward, and a first hole 112h1 may be disposed in the first pin guide part 112p1.

In addition, the first driving part housing 112b may further include a second pin guide part 112p2 protruding upward and spaced apart from the first pin guide part 112p1. A second guide hole 112h2 may be disposed in the second pin guide part 112p2.

According to the embodiment, the first guide pin 51 can be inserted into the first and second guide holes 112h1 and 112h2 of the first pin guide part 112p1 and the second pin guide part 112p2, so that the first lens assembly 110 can be precisely guided parallel to the optical axis direction.

Accordingly, according to the embodiment, the first guide pin 51 can be in contact with the first pin guide portion 112p1 and the second pin guide portion 112p2 of the first housing 112, thereby minimizing the contact area between them and thus friction resistance can be prevented. Accordingly, according to the embodiment, there are technical effects such as improvement of driving force and reduction of power consumption by preventing occurrence of friction torque during zooming.

In addition, according to the embodiment, by reducing the weight of the first driving unit housing 112b, friction torque can be reduced, thereby improving driving force during zooming, reducing power consumption, and improving control characteristics.

For example, according to the embodiment, a region other than the first pin guide part 112p1 and the second pin guide part 112p2 can be removed from the upper region of the first driving part housing 112b where the first guide pin 51 is located. Accordingly, by reducing the weight of the first driving unit housing 112b, frictional resistance can be reduced, thereby improving driving force during zooming, reducing power consumption, and improving control characteristics.

Continuing with reference to FIGS. 4A and 9A, the first lens housing 112a can guide the movement of the first lens assembly 110 in the optical axis direction by providing at least one pin guide part 112p protruding to the side. At the same time, it is possible to prevent tilting of the central axis by preventing the lens unit from tilting upward and downward.

For example, the first lens housing 112a may include a third pin guide part 112p3 protruding to the side, and a first guide groove 112p3H may be disposed in the third pin guide part 112p3 (see FIG. 9G).

According to the embodiment, the second guide pin 52 can be inserted into the first guide groove 112p3H of the third pin guide part 112p3, so that the first lens assembly 110 can be precisely guided parallel to the optical axis direction.

Accordingly, according to an embodiment, by supporting the second guide pin 52 in the third pin guide part 112p3 of the first lens housing 112a, tilting of the lens portion upward and downward may be prevented, thereby preventing the central axis from being twisted.

In addition, according to the embodiment, by contacting the second guide pin 52 from the third pin guide part 112p3 of the first lens housing 112a, the frictional area can be minimized to prevent frictional resistance, thereby improving driving force during zooming such that there are technical effects such as reduction of power consumption and improvement of control characteristics.

In addition, according to the embodiment, the friction torque can be reduced by reducing the weight of the first lens housing 112a, thereby improving driving force during zooming, reducing power consumption, and improving control characteristics.

For example, according to the embodiment, except for the third pin guide part 112p3, a region of the side region of the first lens housing 112a in which the second guide pin 52 is located may be removed. Accordingly, by reducing the weight of the first lens housing 112a, friction torque can be reduced, thereby improving driving force during zooming, reducing power consumption, and improving control characteristics.

Next, FIG. 5 is a plan view of the first lens assembly 110 and the first and second guide pins 51 and 52 shown in FIG. 4A.

Specifically, FIG. 5 shows a first angle $\Theta1$ and a second angle $\Theta2$ formed by the horizontal axis Xa of the first lens housing 112a of the first lens assembly 110, respectively, with respect to the first lens assembly 110 shown in FIG. 4A based on a first z-axis Z1 and a second z-axis Z2 that pass through the first pin guide portion 112p1 and the second pin guide portion 112p2, respectively.

As described above, in order to obtain the best optical characteristics using a plurality of zoom lens groups in a recent camera module, alignment between a plurality of lens groups must be well matched. However, a decent where the spherical center between the lens groups deviates from the optical axis, a tilt, which is a lens inclination phenomenon, or a phenomenon in which the central axis of the lens group and the image sensor are not aligned, are occurring. As a result, the angle of view changes or out-of-focus occurs, which adversely affects image quality and resolution.

Accordingly, according to an embodiment, in order to minimize decenter or tilt of the lens during zooming by increasing the precision of lens alignment, it is important to control the first angle $\Theta1$ and the second angle $\Theta2$ between the first z axis Z1, the second z axis Z2, and the horizontal axis Xa of the lens housing 112a respectively to be substantially vertical (90°).

Next, FIG. 6A is a second exploded perspective view of the camera module according to the embodiment shown in FIG. 2. In addition, FIG. 6B is a front view of the cover 21 viewed from the direction of the first lens assembly 110 in the camera module according to the embodiment shown in FIG. 6A.

Referring to FIGS. 6A and 6B, the cover 21 of the embodiment may have a first hook 21p1 and a second hook 21p2 disposed in a diagonal direction while protruding from the first cover body 21b in the direction of the body 25.

In addition, the body 25 may include a first hook coupling portion 26a1 and a second hook coupling portion 26a2 disposed at positions corresponding to the first hook 21p1 and the second hook 21p2, respectively. A first hole 26h1 and a second hole 26h2 may be disposed in each of the first hook coupling portion 26a1 and the second hook coupling portion 26a2, respectively.

The first hook 21p1 and the second hook 21p2 of the cover 21 may be coupled to the first hole 26h1 and the second hole 26h2 of the body 25, respectively. In addition, the cover 21 may be stably coupled to the body 25 using an adhesive. The first hook 21p1 and the second hook 21p2 may be referred to as a first protrusion coupling part 21p1 and a second protrusion coupling part 21p2, respectively.

In addition, the cover 21 may include a first guide pin 51, a first pin coupling part 21h1 and a second pin coupling part 21h2 respectively coupled to the second guide pin 52.

For example, the cover 21 may include the first pin coupling part 21h1 and the second pin coupling part 21h2 protruding from the first cover body 21*b* toward the body 25. In addition, the first guide pin 51 and the second guide pin 52 may be inserted and coupled, respectively.

Next, FIG. 7A is an enlarged view of the first area E1 of the cover 21 in the camera module according to the embodiment shown in FIG. 6B, FIG. 7B is a cross-sectional view of the first area E1 of the cover 21 in the camera module according to the embodiment shown in FIG. 7A, and FIG. 7C is an enlarged view of the second area E2 of the cover in the camera module according to the embodiment shown in FIG. 6B.

Referring back to FIG. 6B, a first y-axis y1 may be a y-axis passing through a center of the first hook 21*p*1 in the cover 21 and the second y-axis y2 may be a y-axis passing through a center of the second hook 21*p*2 of the cover.

In FIG. 6B, the first x-axis x1 is a x-axis passing through the center of the first hook 21*p*1 of the cover, and a second x-axis x2 is the x-axis passing through the center of the second hook 21*p*2 of the first cover.

Referring to FIGS. 6B, 7A, and 7B, the first y-axis y1 passing through the center of the first hook 21*p*1 of the cover may pass through the center 21*h*2C of the second pin coupling portion 21*h*2. Accordingly, it is possible to minimize decenter or tilt of the lens during zooming by increasing the precision of alignment between lenses.

Also, for example, referring to FIGS. 7A and 7B, the second pin coupling portion 21*h*2 may include a second outer wall 21*h*2W protruding in a boss shape and a second coupling groove 21*h*2H disposed inside the second outer wall 21*h*2W. The protruding second outer wall 21*h*2W may have a circular shape. In addition, the second pin coupling portion 21*h*2 may include a second outer wall inclined surface 21*h*2WS between the second outer wall 21*h*2W and the second coupling groove 21*h*2H. In the embodiment, a circular center 21*h*2C formed by the second outer wall 21*h*2W protruding from the second pin coupling portion 21*h*2 can be a point where the first y-axis (y1) intersects the third x-axis (x3) parallel to the second x-axis (x2).

At this time, in the embodiment, the center 21*h*2C of the second coupling groove 21*h*2H can be designed to coincide with the circular center 21*h*2C formed by the second outer wall 21*h*2W, so that the accuracy of alignment between lenses can be improved.

Next, FIG. 7C is an enlarged view of the second area E2 of the cover 21 in the camera module according to the embodiment shown in FIG. 6B and FIG. 7D is a cross-sectional view of a second area E2 of the cover in the camera module according to the embodiment shown in FIG. 7C.

First, referring to FIG. 7C, the first pin coupling part 21*h*1 may include a first outer wall 21*h*1W protruding in the form of a boss and a first groove 21*h*1H disposed inside the first outer wall 21*h*1W.

At this time, referring to FIGS. 6B and 7C, the center 21*h*1C of the first pin coupling portion 21*h*1 may be eccentrically disposed to be spaced apart from the second y-axis y2 passing through the center of the second hook 21*p*2 of the cover. Accordingly, it is possible to minimize decenter or tilt of the lens during zooming by increasing the precision of alignment between lenses.

For example, referring to FIG. 7C, in the embodiment, the center 21*h*1WC of the first pin coupling portion 21*h*1 may be a point where the second y-axis y2 intersects a fourth x-axis x4 parallel to the second x-axis x2.

At this time, in the embodiment, the center 21*h*1C of the first groove 21*h*1H may be a point where the third y-axis y3 which is parallel to the second y-axis y2 and is spaced apart therefrom intersects a fifth x-axis x5 which is parallel to the fourth x-axis x4 and is spaced apart therefrom.

Referring to FIGS. 5 and 6B for a moment, in the embodiment, in order to increase the accuracy of lens alignment between a plurality of lens groups, the center 21*h*1C of the first pin coupling portion 21*h*1 can be eccentrically arranged to be spaced apart in the range of about 0.1 mm±0.02 mm from the second y-axis y2 passing through the center of the second hook (21*p*2). Accordingly, the first and second angles Θ1 and Θ2 formed by the first z-axis Z1, the second z-axis Z2, and the horizontal axis Xa of the first lens housing 112*a* can be substantially secured vertical (90°).

In addition, in an embodiment, in order to increase the precision of lens alignment between a plurality of lens groups, the center 21*h*1C of the first groove 21*h*1H provided in the first pin coupling portion 21*h*1 can be arranged eccentrically spaced apart from the center 21*h*1WC of the first pin coupling portion 21*h*1. Accordingly, the first angle Θ1 and the second angle Θ2 formed by the first z-axis Z1, the second z-axis Z2, and the horizontal axis Xa of the first lens housing 112*a*, respectively, are can be secured vertical such as in the range of 90°±1° such that alignment accuracy between lens groups can be ensured.

In addition, in the embodiment, the first pin coupling part 21*h*1 may include a chamfer 21*h*1WS between an upper end of the first outer wall 21*h*1W and an upper end of the first groove 21*h*1H.

Next, FIG. 7D is a cross-sectional view of a second area E2 of the cover taken along line X5 in the camera module according to the embodiment illustrated in FIG. 7C. FIG. 7E is another cross-sectional view of the second area E2 of the cover in the camera module according to the embodiment shown in FIG. 7D. And FIG. 7D shows an embodiment in which the first groove 21*h*1H is eccentric to the right. In FIG. 7E, the first groove 21*h*1H is eccentric to the left. Hereinafter, it will be described with reference to FIG. 7D.

Referring to FIG. 7D, the first pin coupling part 21*h*1 may include a first outer wall 21*h*1W protruding in the form of a boss and a first groove 21*h*1H disposed inside the first outer wall 21*h*1W.

At this time, referring to FIG. 7D, the center 21*h*1C of the first groove 21*h*1H can be spaced apart from the center 21*h*1WC of the first outer wall 21*h*1W included in the first pin coupling part 21*h*1 to be eccentrically disposed. In addition, by increasing the alignment accuracy between lenses or between the lens and the image sensor through this, it is possible to minimize decenter or tilt of the lens during zooming.

In addition, in the embodiment, the center 21*h*1C of the first pin coupling part 21*h*1 can be eccentrically arranged so that it is spaced apart from the second y-axis y2 passing through the center of the second hook 21*p*2 of the cover to improve the accuracy of alignment between lenses such that it is possible to minimize decenter or tilt of the lens during zooming.

For example, referring to FIG. 7D, in the embodiment, the center 21*h*1WC of the first outer wall 21*h*1W protruding from the first pin coupling part 21*h*1 can be arranged to be spaced apart in the range of about 0.1 mm±0.02 mm from the center 21*h*1C of the first groove 21*h*1H.

Accordingly, the center 21*h*1C of the first groove 21*h*1H of the first pin coupling part 21*h*1 can be aligned with the center 21*h*1WC of the first outer wall 21*h*1W in order to increase the accuracy of lens alignment between the plurality of lens groups such that the first and second angles Θ1 and Θ2 formed by the first z-axis Z1, the second z-axis Z2, and the horizontal axis X1 of the first lens housing 112a ca be precisely controlled to be substantially vertical) (90°).

In addition, referring to FIG. 7D, in an embodiment, the first pin coupling part 21h1 may include a chamfer 21h1WS between the upper end of the first outer wall 21h1W and the upper end of the first groove 21h1H.

For example, in the embodiment, the first pin coupling part 21h1 may include an inclined wall 21h1WS between an outer upper end of the first outer wall 21h1W and an inner upper end of the first outer wall 21h1W, and a guide pin 50 can have a technical effect that can be effectively seated and inserted and coupled.

According to the embodiment, a second groove in a circular shape can be formed by the inclined surface 21h1WS from the first outer wall 21h1W protruding from the first pin coupling portion 21h1, and a circular first groove may be formed by a surface perpendicular to the first outer wall 21h1W.

In the embodiment shown in FIGS. 7D and 7E, the second groove formed by the circular shape of the inclined surface 21h1WS and the first groove formed by the surface perpendicular to the first outer wall 21h1W can be moved respectively on the right side or the left side.

Next, FIG. 8A is a front view of the base 22 viewed from the body 25 direction in the camera module according to the embodiment shown in FIG. 2, and FIG. 8B is an enlarged view of a third area E3 of a base in the camera module according to the embodiment illustrated in FIG. 8A.

In FIG. 8A, the first y-axis y1 can be an axis passing through the center of the first base groove 22ph1 of the base 22, and the second y-axis y2 can be a axis passing the center of the second base groove 22ph2 of the base.

In addition, in FIG. 8A, the first x-axis x1 can be an axis passing through the center of the second base groove 22ph2 of the base, and the second x-axis x2 can be an axis passing through the center of the first base groove 22ph1 of the base.

Referring to FIG. 8A, a first y-axis y1 passing through the center of the second-first hole 22ph1 of the base may pass through the center of the third pin coupling portion 22h3. Accordingly, it is possible to minimize decenter or tilt of the lens during zooming by increasing the precision of alignment between lenses.

In addition, referring to FIG. 8A, the fourth pin coupling portion 22h4 may include a second coupling groove 21h4W protruding in a boss shape and a fourth coupling groove 22h4H disposed inside second coupling groove 21h4W.

At this time, referring to FIG. 8A, the second y-axis y2 passing through the circular center of the second coupling groove 21h4W provided in the fourth pin coupling portion 22h4 can be eccentrically arranged to be spaced apart from the third y-axis y3 passing through the center of the fourth coupling groove 22h4H such that it is possible to minimize decenter or tilt of the lens during zooming by increasing the precision of alignment between lenses.

Also, referring to FIG. 8A, the center of the circular shape of the second coupling groove 21h4W provided in the fourth pin coupling portion 22h4 and the center of the fourth coupling groove 22h4H may be eccentrically disposed to be spaced apart from each other such that it is possible to minimize decenter or tilt of the lens during zooming by increasing the precision of alignment between lenses.

In the embodiment, a depth of the third coupling groove 22h3H of the third pin coupling portion 22h3 disposed on the base 22 or a depth of the fourth coupling groove 22h4H of the fourth pin coupling portion 22h4 may be different from a depth of the first groove 21h1H of the first pin coupling portion 21h1 disposed on the described cover 21 or a depth of the second coupling groove 21h2H of the second pin coupling portion 21h2.

For example, in the embodiment, the base 22 may be coupled to the guide pin 50 after the cover 21, and the depth of the third coupling groove 22h3H of the third pin coupling portion 22h3 disposed on the base 22 or a depth of the fourth coupling groove 22h4H of the fourth pin coupling portion 22h4 may be designed to be deeper than the depth of the first groove 21h1H of the first pin coupling portion 21h1 of the described cover 21 or the depth of the second coupling groove 21h2H of the second pin coupling portion 21h2, and accordingly assembling with the guide pin 50 can be facilitated. Also, a depth of the third coupling groove 22h3H or a depth of the fourth coupling groove 22h4H in the base 22 coupled to the guide pin 50 later can be deeper than a depth of the first groove 21h1H in the cover 21 or a depth of the second coupling groove 21h2H such that the coupling force can be further increased.

FIG. 8B is an enlarged view of a third part E of the base in the camera module according to the embodiment shown in FIG. 8A.

Referring to FIGS. 8A and 8B together, the base 22 may have a first base groove 22ph1 and a second base groove 22ph2, which are coupled a first coupling protrusion protruding from the body 25 and a second coupling protrusion (not shown), respectively.

In this case, in the embodiment, the first base groove 22ph1 of the base 22 may have a size corresponding to the shape of the first coupling protrusion and may have a circular shape, and the second base groove 22ph2 may have a size larger than a cross-sectional area of the second coupling protrusion and may have an oval shape.

Accordingly, it may be firmly coupled to the first coupling protrusion by the first base groove 22ph1 of the base 22. And the second base groove 22ph2 may be formed larger than the second coupling protrusion, thereby covering a fine tolerance of the second coupling protrusion occurring in the D2 direction, and preventing rotation in the D1 direction. The fine tolerance of the second coupling protrusion may be a tolerance for a size and a position for forming a product. Also, the second base groove 22ph2 may be formed to extend in the center direction of the first base groove 22ph1.

Next, FIG. 9A is a perspective view of a first lens assembly in the camera module according to the embodiment shown in FIG. 4A, and FIG. 9B is a plan view of the first lens assembly in the camera module according to the embodiment shown in FIG. 9A, and FIG. 9C is an enlarged view of a fourth area E4 of the first lens assembly in the camera module according to the embodiment illustrated in FIG. 9A.

Specifically, FIGS. 9A and 9B show a first angle Θ1, a second angle Θ2 made by a first z-axis Z1 passing through the first pin guide part 112p1, the second pin guide part 112p2 provided in the first lens assembly 110 shown in FIG. 4A, a second z-axes z2 passing through the third pin guide part 112p3 and the horizontal axis Xb of the first lens housing 112a of the first lens assembly 110, respectively.

As described above, in order to obtain the best optical characteristics using a plurality of zoom lens groups in a recent camera module, alignment between a plurality of lens groups must be well matched. However, there is a decent in which the spherical center between the lens groups deviates from the optical axis, a tilt, which is a lens inclination, or a phenomenon in which the central axis of the lens group and the image sensor is not aligned. So, the angle of view may change or out of focus may happen such that image quality and resolution ca be adversely affected.

Accordingly, according to an embodiment, in order to minimize decenter or tilt of the lens during zooming by increasing the precision of lens alignment, it is important to control the first angle Θ1 and the second angle Θ2 between the first z axis Z1, the second z axis Z2, and the horizontal axis Xa of the lens housing 112a respectively to be substantially vertical (90°).

Next, FIG. 9C is an enlarged view of the fourth area E4 of the first lens assembly in the camera module according to the embodiment shown in FIG. 9A and FIG. 9DA is a cross-sectional view of a fourth area E4 of the first lens assembly in the camera module according to the exemplary embodiment illustrated in FIG. 9C.

On the other hand, FIGS. 9DB and 9DC are other cross-sectional views of a fourth enlarged view of a portion of the first lens assembly in the camera module according to the embodiment shown in FIG. 9DA. FIG. 9DA shows an embodiment in which the central axis z3 of the first hole is eccentric to the left compared to the central axis z1 of the second hole. FIG. 9DB shows an embodiment in which the central axis z3A of the first hole is eccentric to the right compared to the central axis z1 of the second hole. Meanwhile, FIG. 9DC shows an embodiment in which the central axis z3 of the first hole is not eccentric compared to the central axis z1 of the second hole, and the central axis z3 of the first hole is the same as the central axis z1 of the second hole.

FIGS. 9EA to 9EC are front views of a partial fourth enlarged view of the first lens assembly in the camera module according to the embodiment shown in FIGS. 9DA to 9DC.

Meanwhile, FIG. 9FA is an enlarged view of a fifth area E5 of the first lens assembly in the camera module according to the embodiment shown in FIG. 9A, and FIG. 9FB is a cross-sectional view of the fifth area E5 of the first lens assembly in the camera module according to the embodiment shown in FIG. 9FA.

Referring to FIGS. 9C and 9DA, the first pin guide part 112p1 may include a first guide wall 112p1W and a first hole 112h1 disposed inside the first guide wall 112p1W.

In addition, in an embodiment, the first pin guide part 112p1 may include a first step 112p1WT between the first guide wall 112p1W and the first hole 112h1.

At this time, referring to FIGS. 9C and 9DA, the center 112h1c of the first hole of the first pin guide part 112p1 is spaced apart from the center 112p1WC of the first guide wall 112p1W of the first pin guide part 112p1 such that it is possible to minimize decenter or tilt of the lens during zooming by increasing the precision of alignment between lenses by placing them eccentric as possible.

For example, referring to FIG. 9C, in the embodiment, the center of the first guide wall 112p1WC in the first pin guide part 112p1 may be a point where the second y-axis y2 and the fourth x-axis x4 intersect each other.

At this time, in the embodiment, the center of the first hole 112h1C may be a point where the third y-axis y3 parallel to the second y-axis y2 and spaced apart therefrom intersect the fifth x-axis x5 parallel to the fourth x-axis x4 spaced apart therefrom.

In addition, referring to FIG. 9DA, in an embodiment, the center 112p1WC of the first guide wall in the first pin guide part 112p1 may be a point where the second z-axis yz and the fourth x-axis x4 intersect each other.

In addition, in the embodiment, the center of the first hole 112h1C may be a point where the third z-axis z3 parallel to the second z-axis yz and spaced apart therefrom intersects the fifth x-axis x5 parallel to the fourth x-axis x4 and spaced apart therefrom.

In addition, FIG. 9DB is an embodiment that is eccentric to the right, and referring to FIG. 9DB, in the embodiment, the center 112h1CA of the first hole may be a point where the 3A z-axis z3A parallel to the second z-axis yz and spaced apart therefrom intersects the fourth x-axis x4.

Meanwhile, FIG. 9DC is an embodiment that is not eccentric, and referring to FIG. 9DC, in the embodiment, the center 112h1CB of the first hole may be a point where the z1 axis and the fourth x axis x4 intersect each other.

Referring to FIGS. 9C and 9DA, the center 112h1c of the first hole may be eccentrically disposed to be spaced apart from the center 112p1WC of the first guide wall in a range of about 0.1 mm±0.02 mm. In addition, the first and second angles Θ1 and Θ2 made by the first z-axis Z1 and the second z-axis Z2 and the horizontal axis Xb of the first lens housing 112a, respectively, can be substantially secured vertical (90°) such that it is possible to increase the precision of lens alignment between a plurality of lens groups.

In addition, according to an embodiment, the circular center 112pWC of the first guide wall 112p1W provided in the first pin guide part 112p1 can be arranged eccentrically to be spaced apart from the center of the first hole 112h1c of the first pin guide part 112p1.

Accordingly, the first and second angles Θ1 and Θ2 made by the first z-axis Z1, the second z-axis Z2, and the horizontal axis Xb of the first lens housing 112a can be substantially secured vertical in the range of 90°±1° such that alignment accuracy between lens groups can be secured.

Meanwhile, referring to FIG. 9FA, the fifth pin guide part 112p5 may include a fifth guide wall 112p5W and a fifth hole 112h5 disposed inside the fifth guide wall 112p5W.

In addition, the fifth pin guide part 112p5 may include a second step 112p5WT between the fifth guide wall 112p5W and the fifth hole 112h5.

In this case, according to another embodiment illustrated in FIGS. 9FA and 9FB, the center of the fifth pin guide part 112p5 may coincide with the center of the fifth hole 112h5.

For example, referring to FIGS. 9FA and 9FB, the center of the fifth guide wall 112p5WC and the center of the fifth hole 112h5C may coincide.

For example, referring to FIG. 9FA, in the embodiment, the center 112p5WC of the fifth guide wall may be a point where the first y-axis y1 and the first x-axis x1 intersect each other. Also, the center 112h5C of the fifth hole may be a point where the first y-axis y1 and the first x-axis x1 intersect each other.

Accordingly, according to another embodiment illustrated in FIG. 9FA, the center of the fifth pin guide part 112p5 may coincide with the center of the fifth hole 112h5 without being eccentric.

In addition, referring to FIG. 9FB, in an embodiment, the center 112p5WC of the fifth guide wall may be a point where the first z-axis z1 and the first x-axis x1 intersect each other. Also, the center 112h5C of the fifth hole may be a point where the first z-axis z1 and the first x-axis x1 intersect each other.

Accordingly, according to another embodiment illustrated in FIG. 9FB, the center of the fifth pin guide part 112p5 may coincide with the center of the fifth hole 112h5 without being eccentric.

Next, FIG. 9G is a partially enlarged view of another embodiment of the pin guide part 112p3 in the camera actuator according to the embodiment shown in FIG. 9A.

FIG. 9G, the first lens housing 112a may include a third pin guide part 112p3 protruding to the side, and a first pin guide groove 112p3H can be placed in the third pin guide part 112p3.

In an embodiment, the first lens housing 112a may include a first pin guide groove 112p3H, and the first pin guide groove 112p3H may be eccentrically disposed to be spaced apart in the Y-axis direction shown in the drawing.

For example, according to the embodiment, the center 112p3HC of the first pin guide groove 112p3H may be disposed to be spaced apart from the center 112p3C of the third pin guide part 112p3 in an upper or lower direction.

For example, referring to FIG. 9G, according to an embodiment, the center 112p3C of the third pin guide part 112p3 may be a point where the Z2 and Y-axis intersect.

At this time, the first pin guide groove 112p3H is parallel to Z2 and may be moved downward along the Y axis to be disposed.

Accordingly, the center 112p3HC of the first pin guide groove 112p3H may be a point where the Z5 axis parallel to Z2 and the Y axis intersect each other.

Accordingly, according to another embodiment illustrated in FIG. 9FB, the center of the fifth pin guide part 112p5 may coincide with the center of the fifth hole 112h5 without being eccentric.

In the embodiment, the third pin coupling part 22h3 may be a base pin coupling part, and the first pin coupling part 21h1 may be referred to as a cover pin coupling part.

In the embodiment, at least one of the central axis of the third pin coupling portion 22h3, the central axis 21h1WC of the first pin coupling portion 21h1, and the central axis 112h1C of the first hole can be arranged to be spaced apart from a central axis of the coupling groove 22h3H of the third pin coupling part 22h3 or a center axis 21h1C of the groove 21h1H of the first pin coupling part 21h1 or a center 112p1WC of the first guide wall 112p1W of the first pin guide part 112p1. Accordingly, it is possible to increase the alignment accuracy between the lens groups and the alignment accuracy between the lens group and the image sensor.

In the embodiment, a hole through which the guide pin 51 is guided in the lens assembly may be referred to as a first hole 112h1, and a hole extending from the first hole and formed by the first guide wall 112p1W may be referred to as a second hole.

At least one of the central axis of the third pin coupling portion 22h3, the central axis 21h1WC of the first pin coupling portion 21h1, and the central axis 112h1C of the first hole can be arranged to be spaced apart from a central axis of the coupling groove 22h3H of the third pin coupling part 22h3 or a center axis 21h1C of the groove 21h1H of the first pin coupling part 21h1 or a center 112p1WC of the first guide wall 112p1W of the first pin guide part 112p1. And the central axis 21h2WC of the second pin coupling portion 21h2 and the central axis 22h4WC of the fourth pin coupling portion 22h4 may be the same with the central axis of the coupling groove (21h2H) of the second pin coupling portion 21h2, the central axis of the groove 22h4H of the fourth pin coupling portion 22h4 and the central axis of the third pin guide portion 112p3, but are not limited thereto.

In the embodiment, at least one of the central axis 21h2WC of the second pin coupling portion (21h2) and the central axis 22h4WC of the fourth pin coupling portion 22h4 may be spaced apart from the central axis of the coupling groove 22h3H of the second pin coupling portion 22h3, or the central axis of the groove 22h4H of the fourth pin coupling portion 22h4 or the central axis of the third pin guide portion 112p3.

In addition, the central axis of the third pin coupling portion 22h3, the central axis 21h1WC of the first pin coupling portion 21h1, and the central axis 112h1C of the first hole may be the same with the center axis of coupling grooves 22h3H of the third pin coupling portion 22h3, or a center axis 21h1C of the groove 21h1H of the first pin coupling portion 21h1 or the center 112p1WC of the first guide wall 112p1W of the first pin guide portion (112p1), however, it is not limited thereto.

Next, FIG. 10A is a partial perspective view of the camera actuator shown in FIG. 4A.

In the actuator according to the embodiment, the first driving unit 310 may further include a first Hall sensor 316 inside the first coil unit 312.

For example, according to the embodiment, a compact camera module can be implemented by arranging the Hall sensor 316 in the inner area of the first coil unit 312 to reduce the area occupied by the Hall sensor.

In addition, according to the embodiment, there is a special technical feature that enables a compact camera module to be implemented by using the first driving magnet 116 in common without using a separate sensing magnet.

Accordingly, according to the embodiment, there is a technical effect that the zooming function can be smoothly performed even in a compact camera module.

Next, FIG. 10B is a graph showing Hall sensor linearity according to a stroke of the camera actuator shown in FIG. 10A.

Referring to FIG. 10B, it can be seen that Hall Linearity is very excellent when the stroke of the lens assembly is about 4 mm in the camera module according to the implementation.

Accordingly, according to the embodiment, there is a special technical effect that can greatly improve the reliability of measuring the position of the lens with only one Hall sensor 316 by placing the Hall sensor 316 in the center of the first driving magnet 116.

The actuator and the camera module including the same according to the embodiment can solve the problem of lens decenter or tilt when zooming, so that the alignment between the plurality of lens groups should be well aligned such that there is a technical effect of remarkably improving the image quality or resolution by preventing the occurrence of changing in angle of view or out of focus.

For example, according to an embodiment, in order to increase the precision of lens alignment between the plurality of lens groups, the center of the first guide pin coupling part can be eccentrically arranged to increase the precision of alignment between the lens groups, so that there is a technical effect that can minimize decenter or lens tilt.

In addition, according to an embodiment, in order to increase the precision of lens alignment between the plurality of lens groups, the center of the first groove can be eccentrically disposed so that the center of the first outer wall can be spaced apart from the center of the first outer wall, thereby increasing the accuracy of alignment between the lens groups and zooming such that there is technical effect that can minimize the decenter or tilt of the lens.

In addition, according to the embodiment, there is a technical effect capable of solving the problem of generating friction torque during zooming.

For example, according to the embodiment, by removing the area other than the first pin guide and the second pin guide from the upper area of the first driving housing where the first guide pin is located, friction can be reduced by reducing the weight of the first driving housing. By reducing the torque and reducing the frictional resistance, there are technical effects such as improvement of driving force during zooming, reduction of power consumption, and improvement of control characteristics.

Accordingly, according to the embodiment, while minimizing the friction torque during zooming, it is possible to prevent the occurrence of a phenomenon in which the decenter or tilt of the lens or the central axis of the lens group and the image sensor are not aligned. Therefore, there is a complex technical effect that can significantly improve image quality or resolution.

In addition, according to the embodiment, there is a technical effect that the zooming function can be smoothly performed even in a compact camera module. For example, according to the embodiment, there is a technical effect that a compact camera module can be implemented by arranging the Hall sensor in the inner area of the first coil to reduce the area occupied by the Hall sensor.

INDUSTRIAL APPLICABILITY

The camera actuator according to the embodiment may be applied to a mobile terminal such as a mobile phone, a laptop computer, a drone, or a vehicle.

For example, the camera actuator according to the embodiment may be included in and embedded in a micro camera module in a portable device such as a smartphone, a tablet PC, and a laptop, and such a camera module automatically adjusts the distance between the image sensor and the lens to perform an autofocus function of aligning the focal length.

Features, structures, effects, and the like described in the embodiments above are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, the contents related to these combinations and modifications should be construed as being included in the scope of the embodiment.

Although the embodiments have been described above, these are only examples and are not intended to limit the embodiments, and those of ordinary skill in the field to which the embodiments belong to various types not illustrated above without departing from the essential characteristics of the present embodiment. It will be seen that several transformation and application are possible. For example, each component specifically shown in the embodiment can be modified and implemented. And differences related to these modifications and applications should be construed as being included in the scope of the embodiments set in the appended claims.

The invention claimed is:

1. A camera actuator comprising:
  a base;
  a lens assembly disposed on the base;
  a guide pin coupled to the base and guiding the lens assembly;
  a body coupled to the base;
  a cover coupled to the body;
  a base pin coupling part disposed on the base and coupled to one side of the guide pin;
  a cover pin coupling part disposed on the cover and coupled to the other side of the guide pin; and
  a pin guide part disposed on the lens assembly and guiding the guide pin,
  wherein the base pin coupling part includes a first coupling groove, and the cover pin coupling part includes a first groove,
  wherein the pin guide part includes a first hole and a second hole having a size different from that of the first hole, and
  wherein at least one of a central axis of the base pin coupling part, a central axis of the cover pin coupling part, and a central axis of the first hole is spaced apart from a central axis of the first coupling groove or a central axis of the first groove or a central axis of the second hole.

2. The camera actuator according to claim 1, wherein the cover pin coupling part includes a second groove having a size different from that of the first groove, and
  wherein a maximum diameter of the first groove is smaller than a maximum diameter of the second groove.

3. The camera actuator according to claim 2, wherein the second groove is extended from the first groove, and
  wherein the second groove includes an inclined surface.

4. The camera actuator according to claim 3, wherein a minimum diameter of the first groove is the same with a minimum diameter of the second groove, and
  wherein the second coupling groove is extended from the first coupling groove.

5. The camera actuator according to claim 4, wherein the second coupling groove includes an inclined surface, and
  wherein a minimum diameter of the first coupling groove is the same with a minimum diameter of the second coupling groove.

6. The camera actuator according to claim 2, wherein the central axis of the first groove and the central axis of the second groove are the same, and the central axis of the first coupling groove and the central axis of the second coupling groove are the same.

7. The camera actuator according to claim 2, wherein a length of the first groove in an optical axis direction of the first groove is formed to be longer than a length of the second groove in the optical axis direction.

8. The camera actuator according to claim 7, wherein a length of the first coupling groove in the optical axis direction is longer than a length of the second coupling groove in the optical axis direction.

9. The camera actuator according to claim 2, wherein the base pin coupling part includes a second coupling groove having a size different from that of the first coupling groove, and
  wherein a maximum diameter of the first coupling groove is smaller than a maximum diameter of the second groove.

10. The camera actuator according to claim 1, wherein the cover pin coupling part protrudes from the cover, and wherein the base pin coupling part protrudes from the base.

11. The camera actuator according to claim 1, wherein the guide pin, the cover pin coupling part, and the base pin coupling part are included as at least one,
  wherein the base and the body are integrally formed, and
  wherein the guide pin is inserted into the base pin coupling part, the cover pin coupling part and the pin guide part.

12. The camera actuator according to claim 1, wherein the body includes a first protrusion and a second protrusion protruding from the body, and
  wherein the base includes a first base groove and a second base groove at positions corresponding to the first protrusion and the second protrusion.

13. The camera actuator according to claim 12, wherein a size of the first base groove corresponds to a size of the first protrusion, wherein a size of the second base groove is larger than a size of the second protrusion, and wherein the second base groove of the base extends in a direction of the first base groove.

14. The camera actuator according to claim 1, wherein a diameter of the first hole is smaller than a diameter of the second hole.

15. The camera actuator according to claim 14, wherein the second hole is extended from the first hole.

16. The camera actuator according to claim 15, wherein a length of the first hole in the optical axis direction is formed to be longer than a length of the second hole of the lens assembly in the optical axis direction.

17. A camera module comprising the camera actuator of claim 1.

\* \* \* \* \*